US009128810B1

(12) United States Patent
Blaine et al.

(10) Patent No.: US 9,128,810 B1
(45) Date of Patent: Sep. 8, 2015

(54) METHOD AND SYSTEM FOR PORTIONING WORKPIECES TO DIRECTLY-CONTROLLED AND/OR INDIRECTLY-CONTROLLED CHARACTERISTICS

(75) Inventors: George R. Blaine, Lake Stevens, WA (US); Craig E. Pfarr, Issaquah, WA (US); David A. Below, Port Clinton, OH (US)

(73) Assignee: John Bean Technologies Corporation, Chicago, IL (US)

( * ) Notice: Subject to any disclaimer, the term of this patent is extended or adjusted under 35 U.S.C. 154(b) by 827 days.

(21) Appl. No.: 13/358,423

(22) Filed: Jan. 25, 2012

Related U.S. Application Data

(60) Continuation-in-part of application No. 13/013,771, filed on Jan. 25, 2011, now Pat. No. 8,688,259, which is a continuation-in-part of application No. 12/369,687, filed on Feb. 11, 2009, now Pat. No. 8,412,366, which is a division of application No. 11/030,622, filed on Jan. 5, 2005, now Pat. No. 7,593,785.

(60) Provisional application No. 60/535,354, filed on Jan. 9, 2004.

(51) Int. Cl.
*G06F 19/00* (2011.01)
(52) U.S. Cl.
CPC ....................................... *G06F 19/00* (2013.01)
(58) Field of Classification Search
CPC ........................................................ G06F 19/00
USPC ............................................ 700/186, 97, 103
See application file for complete search history.

(56) References Cited

U.S. PATENT DOCUMENTS

| | | | |
|---|---|---|---|
| 3,800,650 A | 4/1974 | Schroder |
| 4,962,568 A | 10/1990 | Rudy |
| 5,076,124 A | 12/1991 | Whitehouse |
| 5,163,865 A | 11/1992 | Smith |
| 5,937,080 A | 8/1999 | Vogeley, Jr. |
| 6,164,174 A | 12/2000 | Sigurdsson |
| 6,612,920 B1 | 9/2003 | Young |
| 6,974,373 B2 | 12/2005 | Kriesel |
| 6,983,678 B2 | 1/2006 | Wattles |
| 7,007,595 B2 | 3/2006 | Ozery |
| 2002/0034571 A1 | 3/2002 | Zimmerman |

FOREIGN PATENT DOCUMENTS

| | | |
|---|---|---|
| GB | 2 364 894 A | 2/2002 |
| NZ | 228432 A | 5/1991 |
| WO | 02/079347 A1 | 10/2002 |

*Primary Examiner* — Tejal Gami
(74) *Attorney, Agent, or Firm* — Christensen O'Connor Johnson Kindness PLLC

(57) ABSTRACT

A method and system are provided for automatically portioning workpieces, such as food products, by simulating portioning the workpieces in accordance with one or more directly controlled characteristics (parameters/specifications) and/or indirectly controlled characteristics (parameters/specifications). The workpiece is scanned to obtain scanning information, then simulating portioning of the workpiece is carried out in accordance with the one or more directly controlled characteristics (parameters/specifications), thereby to determine the one or more indirectly controlled characteristics of the one or more final pieces to be portioned from the workpiece. The simulated portioning of the workpiece is performed for multiple combinations of one or more directly controlled characteristics until an acceptable set of one or more directly controlled characteristics and/or one or more indirectly controlled characteristics is determined.

25 Claims, 13 Drawing Sheets

DESIGN SUPER SHAPE

| | | | | |
|---|---|---|---|---|
| 1) | 0.0 mm | 0.0 mm | 25) | 18.8 mm | 14.7 mm |
| 2) | 1.6 mm | 0.0 mm | 26) | 17.9 mm | 15.7 mm |
| 3) | 2.9 mm | 0.0 mm | 27) | 16.9 mm | 16.4 mm |
| 4) | 4.2 mm | 0.0 mm | 28) | 15.7 mm | 17.1 mm |
| 5) | 5.5 mm | 0.0 mm | 29) | 14.5 mm | 17.5 mm |
| 6) | 6.8 mm | 0.0 mm | 30) | 13.2 mm | 17.8 mm |
| 7) | 8.1 mm | 0.0 mm | 31) | 11.9 mm | 17.9 mm |
| 8) | 9.4 mm | 0.0 mm | 32) | 10.6 mm | 17.9 mm |
| 9) | 10.7 mm | 0.0 mm | 33) | 9.4 mm | 17.7 mm |
| 10) | 12.0 mm | 0.1 mm | 34) | 8.1 mm | 17.2 mm |
| 11) | 13.3 mm | 0.1 mm | 35) | 7.0 mm | 16.6 mm |
| 12) | 14.6 mm | 0.3 mm | 36) | 5.9 mm | 15.8 mm |
| 13) | 15.9 mm | 0.7 mm | 37) | 5.0 mm | 15.0 mm |
| 14) | 17.0 mm | 1.4 mm | 38) | 4.1 mm | 14.0 mm |
| 15) | 17.9 mm | 2.3 mm | 39) | 3.5 mm | 13.0 mm |
| 16) | 18.7 mm | 3.3 mm | 40) | 2.8 mm | 11.9 mm |
| 17) | 19.2 mm | 4.5 mm | 41) | 2.3 mm | 10.8 mm |
| 18) | 19.6 mm | 5.8 mm | 42) | 1.8 mm | 9.6 mm |
| 19) | 19.7 mm | 7.1 mm | 43) | 1.5 mm | 8.4 mm |
| 20) | 15.0 mm | 8.4 mm | 44) | 1.1 mm | 7.1 mm |
| 21) | 10.0 mm | 9.7 mm | 45) | 0.8 mm | 5.9 mm |
| 22) | 15.0 mm | 11.0 mm | 46) | 0.6 mm | 4.6 mm |
| 23) | 19.7 mm | 12.3 mm | 47) | 0.4 mm | 3.3 mm |
| 24) | 19.4 mm | 13.5 mm | 48) | 0.2 mm | 2.0 mm |

SAVE THIS SHAPE

MOVE THIS POINT

METHOD AND SYSTEM FOR PORTIONING WORKPIECES TO DIRECTLY-CONTROLLED AND/OR INDIRECTLY-CONTROLLED CHARACTERISTICS

CROSS-REFERENCES TO RELATED APPLICATIONS

This application is a continuation-in-part of application Ser. No. 13/013,771 filed Jan. 25, 2011, which is a continuation-in-part of application Ser. No. 12/369,687, filed Feb. 11, 2009, which is a division of application Ser. No. 11/030,622, filed Jan. 5, 2005, now U.S. Pat. No. 7,593,785, issued Sep. 22, 2009, which claims the benefit of Provisional Application No. 60/535,354, filed Jan. 9, 2004, the disclosures of which are all hereby incorporated by reference herein.

FIELD OF THE INVENTION

The present invention relates generally to processing workpieces such as food products, and more specifically, to portioning workpieces into pieces, while also considering one or more other parameters such as weight and size.

BACKGROUND OF THE INVENTION

Workpieces, including food products, are portioned or otherwise cut into smaller pieces by processors in accordance with customer needs. Also, excess fat, bone, and other foreign or undesired materials are routinely trimmed from food products. It is usually highly desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on an infeed conveyor belt and a determination is made through the use of a computer as to how best to portion the chicken breast to the weights desired by the customer, with no or limited amount of fat, so as to use the chicken breast most effectively.

Portioning and/or trimming of the workpiece can be carried out by various cutting devices, including high-speed liquid jet cutters (liquids may include, for example, water or liquid nitrogen) or rotary or reciprocating blades, after the food product is transferred from the infeed to a cutting conveyor. Once the portioning/trimming has occurred, the resulting portions are off-loaded from the cutting conveyor and placed on a take-away conveyor for further processing or, perhaps, to be placed in a storage bin.

Portioning machines of the foregoing type are known in the art. Such portioning machines, or portions thereof, are disclosed in prior patents, for example, U.S. Pat. Nos. 4,962,568 and 5,868,056, which are incorporated by reference herein. Typically, the workpieces are first carried by an infeed conveyor past a scanning station, whereat the workpieces are scanned to ascertain selected physical parameters, for example, their size and shape, and then to determine their weight, typically by utilizing an assumed density for the workpieces. In addition, it is possible to locate discontinuities (including voids), foreign material, and undesirable material in the workpiece, for example, bones or fat in a meat portion.

The scanning can be carried out utilizing a variety of techniques, including a video camera to view a workpiece illuminated by one or more light sources. Light from the light source is extended across the moving conveyor belt to define a sharp shadow or light stripe line. When no workpiece is being carried by the infeed conveyor, the shadow line/light stripe forms a straight line across the conveyor belt. However, when a workpiece passes across the shadow line/light stripe, the upper, irregular surface of the workpiece produces an irregular shadow line/light stripe as viewed by a video camera directed downwardly at an angle on the workpiece and the shadow line/light stripe. The video camera detects the displacement of the shadow line/light stripe from the position it would occupy if no workpiece were present on the conveyor belt. This displacement represents the thickness (height) of the workpiece. The width of the workpiece is determined by the width of the irregular shadow line/light stripe. The length of the workpiece is determined by the length of belt travel that shadow lines/light stripes are created by the workpiece. In this regard, an encoder is integrated into the infeed conveyor, with the encoder generating pulses at fixed distance intervals corresponding to the forward movement of the conveyor.

The data and information measured/gathered by the scanning devices are transmitted to a computer, typically on board the portioning apparatus, which records the location of the workpiece on the conveyor as well as the shape and other parameters of the workpiece. With this information, the computer determines how to optimally cut or portion the workpiece at the portioning station, and the portioning may be carried out by various types of cutting/portioning devices.

Automatic portioning systems of food products, such as boneless chicken breasts, should be capable of cutting the products into uniform shape, weight, and other parameters as provided by their users. Oftentimes, the users have finished samples that exemplify the users' particular needs, such as a sample having a desired shape.

Some conventional portioning systems use fixed forms to portion products into a specific shape. A form is like a cookie cutter that is used to stamp out a particular shape, and then the cut piece is trimmed to a desired thickness by various types of knives. The use of forms is cumbersome, in that each form is usable to stamp out only one shape, and thus many forms are required for stamping out various shapes. Also, each form stamps out pieces only to a particular shape, without considering, for example, the resulting weight. Hand cutting is also available for portioning food products into particular shapes, but cutting the products into both uniform shape and uniform weight is very difficult.

Accordingly, a need exists for an improved portioning system, which is capable of cutting workpieces to a specific shape, and of growing, shrinking, or otherwise altering the shape in order to achieve one or more additional parameters such as weight. Preferably, such a portioning system permits a user to readily define the particular shape, and any other parameter, to which workpieces are to be portioned.

The general problem of workpiece portioning, and in particular food workpiece portioning, is to fit acceptable portions into highly variable workpieces and then cut them. The workpieces to be processed, including food workpieces, vary in every dimension, have random defects, and have areas of fat and cartilage that must be avoided. The thickness varies throughout each workpiece in addition to the average thickness varying from workpiece to workpiece.

Processors of the workpieces, for example meat workpieces, expect the portions to be of a narrow weight range, to maximize the number of portions they can sell without dissatisfying anyone. Their customers expect the meat portions to be of a specific shape or close enough to it with a fairly narrow thickness range so that standardized processing can occur, such as a cooking process that will yield uniformly cooked meat. If the meat is to be placed in a bun, it is expected that the plan-view area of the meat portion should be compatible with the bun rather than disappearing inside or hanging over the bun excessively. Also, it is undesirable that large pieces of fat or cartilage exist in a portion. Also, tears, holes, and other defects are unattractive in a portion as well.

These issues are sought to be addressed by the methods and systems discussed below.

SUMMARY OF THE INVENTION

According to one aspect, the present invention is directed to an automatic portioning system to portion workpieces, which may have various thicknesses, into a weight-specific uniform shape, such as into portions having both a specific weight and a specific shape, and which thus may be of varying two-dimensional areas, or sizes (width×length), depending on the varying thickness of each workpiece. In various exemplary embodiments, this is achieved by scaling up or down a template having a specific shape on the workpiece until the desired weight is achieved. The scaled up/down template then becomes the cutting path for the workpiece. In some applications, the weight and shape requirements may be relaxed and the workpieces may be cut into portions having approximate weight and shape within user-specified ranges.

According to another aspect of the present invention, the automatic portioning system may portion workpieces into approximate weight and shape, and further within a user-specified range of area, or sizes (width×length).

According to yet another aspect of the present invention, the automatic portioning system may portion workpieces into size-specific shape, such as portions having a specific size (or size range) and a specific shape (or shape range), and thus may be of a varying weight depending on the varying thickness of each workpiece.

In any of the various embodiments of the present method summarized above, workpieces are cut into portions, each having a specific or approximate shape as predefined by the user, while also satisfying one or more other parameters. In other words, the present invention achieves completely automatic "shape" cutting. Although the methods are of particular use in the context of cutting or portioning foodstuffs in the food products industries, and are described herein relative to such application, their use is not limited to this particular application.

According to a further aspect of the present invention, a method of portioning products involves not only portioning workpieces according to shape and one or more other parameters and/or specifications, but also ensuring that the resulting product has desirable characteristics that are not directly controlled by the portioning process. For example, the method simulates portioning a workpiece to a specific shape and weight A or to the same specific shape and weight B. The method then calculates the size (width×length) and/or thickness of the piece resulting from cutting to the specific shape and weight A, or to the specific shape and weight B, respectively. If the resulting size and/or thickness of the piece portioned to the specific shape and weight A is acceptable, then the workpiece is cut to weight A. If not, it is determined if the resulting size and/or thickness of the piece portioned to the specific shape and weight B is acceptable, and if so, the workpiece is cut to weight B. If either cutting to weight A or weight B will not produce an acceptable size and/or thickness, then no solution exists and no cutting will be performed.

According to a further aspect of the present invention, the step of simulating portioning of the workpiece according to one or more directly controlled characteristics and calculating the one or more indirectly controlled characteristics of the one or more final pieces to be portioned is repeated for multiple combinations of the one or more directly controlled characteristics. Each such combination is rated based on how closely the combination achieves the desired one or more directly controlled characteristics and/or the one or more indirectly controlled characteristics. In this regard, one or more algorithms are used to select potentially acceptable one or more directly controlled characteristics until an acceptable level of one or more directly controlled characteristics and one or more indirectly controlled characteristics are determined.

In another aspect of the present invention, each combination is rated according to an optimization function as applied to one or more of the one or more directly controlled and/or indirectly controlled characteristics, with the optimization rating of the one or more directly controlled and/or indirectly controlled characteristics related to the deviation of the one or more directly controlled and/or indirectly controlled characteristics from an ideal characteristic level.

In a further aspect of the present invention, a weighting factor can be imposed on the one or more directly controlled and/or indirectly controlled characteristics.

According to a still further aspect, the present invention permits a user to define the desired (reference) shape into which the workpieces are to be portioned, by simply scanning in the actual desired shape using the portioning system's vision system. Further, the user is allowed to edit the scanned-in shape in digital data form in order to define a refined shape template to be used in all further processing. To this end, the user can interrupt the normal operation of the automatic portioning system at any time to scan in and edit the desired shape. The desired shape is stored in computer memory and subsequently used to control the downstream cutting/portioning equipment of the portioning system to cut the workpieces into the desired shape.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE EXEMPLARY EMBODIMENTS

With respect to the terminology used in the present application, for the most part, the word "parameter" is used to refer to a physical characteristic or feature such as length, width, thickness, weight or color. Also for the most part, the word "specification" refers to a particular parameter value or range, such as a length of between 110 and 120 mm, a weight that is no more than 30 grams, or the color blue. Also, in accordance with the present application, a specific instance of a parameter will have a value; the value may or may not lie within a particular specification. In spite of the foregoing, it is within the scope of the present application to intermingle the use of the term parameter with the use of the term specification. For example, if the word specification is being utilized, this word should be interpreted broadly enough to also encompass the word parameter, and vice-versa. Also, in the present application, the word "characteristic" shall be a generic term that refers to "parameter" and/or "specification."

Also, as is apparent in the present application, the term "portion" (as derived from a workpiece) has the same meaning as the terms "piece" or "final piece" or "portioned piece."

Figure 1A:
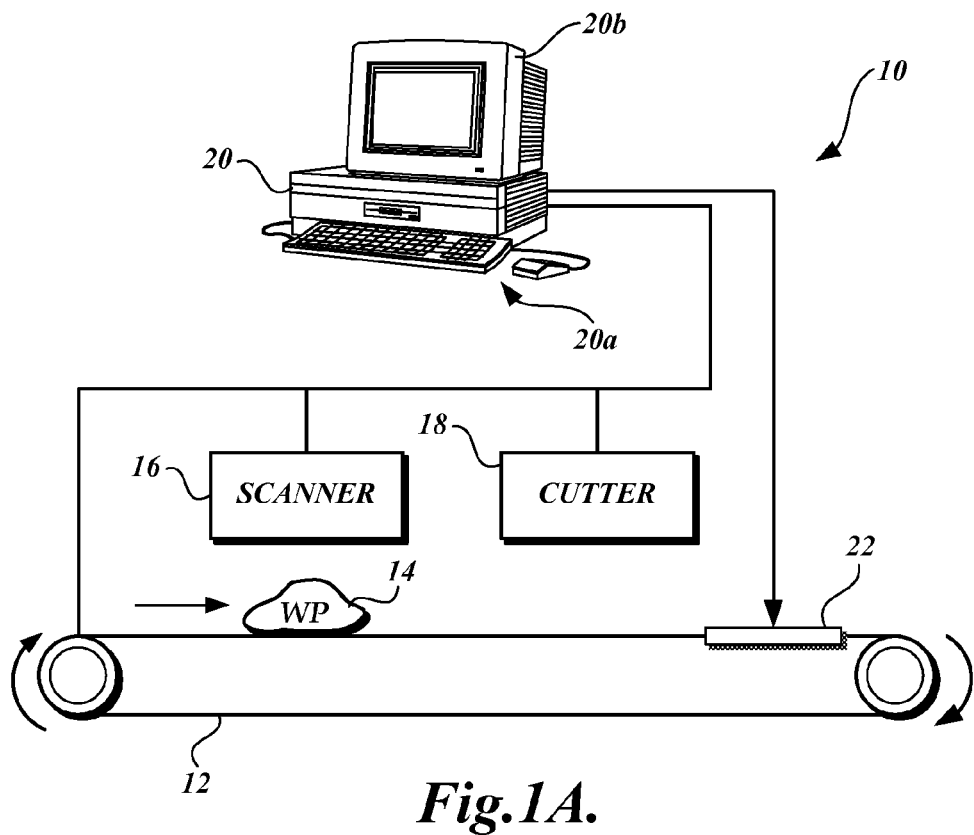
FIG. 1A illustrates a system suitable for use in performing a method of the present invention, wherein the system is operated in Normal Production Mode to process (and portion) workpieces (WP)

FIG. 1A schematically illustrates a system 10 suitable for implementing one embodiment of the present invention. The system 10 includes a conveyor 12 for carrying a workpiece 14 to be portioned thereon, a scanner 16 for scanning the workpiece 14, and a cutter 18 for portioning the workpiece (WP) 14 into one or more pieces. The conveyor 12, scanner 16, and cutter 18 are coupled to, and controlled by, a processor 20. Generally, the scanner 16 scans in the workpiece 14 to produce scanning information representative of the workpiece, and forwards the scanning information to the processor 20. The processor 20 analyzes the scanning information to calculate an optimal cut path to portion the workpiece 14 into one or more desirable pieces. Then, the processor 20 controls the cutter 18 to portion the workpiece 14 according to the calculated cut path. As illustrated, the processor includes an input device 20a (keyboard, mouse, etc.) and an output device 20b (monitor, printer, etc.). The present invention is directed generally to a system and method for cutting workpieces to a particular or approximate shape, while considering one or more other parameters (e.g., weight, length, width, height, etc.).

Describing the foregoing in more detail, the scanning system may be of a variety of different types, including a video camera (as discussed above) to view a workpiece 14 illuminated by one or more light sources. In lieu of a video camera, the scanner 16 may utilize an X-ray apparatus (not shown) for determining the physical characteristics of the workpiece, including its shape, mass, and weight. X-rays may be passed through the object in the direction of an X-ray detector (not shown). Such X-rays are attenuated by the workpiece in proportion to the mass thereof. The X-ray detector is capable of measuring the intensity of the X-rays received thereby, after passing through the workpiece. This information is utilized to determine the overall shape and size of the workpiece 14, as well as the mass thereof. An example of such an X-ray scanning device is disclosed in U.S. Pat. No. 5,585,603, incorporated by reference herein. The foregoing scanning systems are known in the art and, thus, are not novel per se. However, the use of these scanning systems in conjunction with the other aspects of the described embodiments are believed to be new.

The data and information measured/gathered by the scanning device(s) is transmitted to processor 20, which records the location of the workpiece on the conveyor 12 as well as the shape, length, width, thickness, size, outer perimeter, area, weight (typically by using a predicted density of the workpiece) and other parameters/specifications of the workpiece. Processor 20 can be used to determine and record these parameters/specifications with respect to the workpiece as it exists on the conveyor 12 as well as determine these parameters/specifications for the workpiece or for portions cut from the workpiece after further processing or after completion of processing. For example, if the workpiece 14 is in the form of a raw chicken breast, fish fillet, or similar workpiece, processor 20 can be used to determine the size, shape, length, width, thickness, area, outer perimeter, and weight of the workpiece, or portions thereof, after cooking, whether such cooking is by steaming, frying, baking, roasting, grilling, boiling, etc. Typically, such shrinkage is nonsymmetrical and not easily quantifiable but is capable of being modeled, especially with the use of a computer processor. Such model(s) and data relative thereto may be stored in the memory portion of the processor 20. Such model(s) and data can be employed to characterize the workpiece, or portions thereof, after subsequent one or more processing steps.

A memory is utilized in conjunction with the processing unit 20. As noted above, data concerning the desired workpiece, or portion parameters/specifications, as well as the effect on workpieces and/or portions of further processing, may be stored in the memory. The information stored in memory can readily be selected by user via user interface 29b, for example, when changing product lines. For instance, the user may be processing chicken breasts for a particular customer who may require specifications for the portions to be cut from the chicken breasts. When the order for that customer is filled, the user may switch the mode of the computer to meet the specifications of a different customer. The switch may be automated and triggered by a counter that keeps track of the number of product portions that have been processed, or the switch may be carried out manually to allow the user time to retool any apparatus or recalibrate the equipment.

In various exemplary embodiments, the portioning system 10 is capable of operating in generally two modes: Normal Production Mode and Shape Input Mode. Briefly, during Shape Input Mode, a user is prompted to input and perhaps further edit a reference shape (template) to which workpieces are to be portioned. During Normal Production Mode, the portioning system automatically portions workpieces carried on a conveyor into pieces corresponding to the reference shape.

Figure 2:
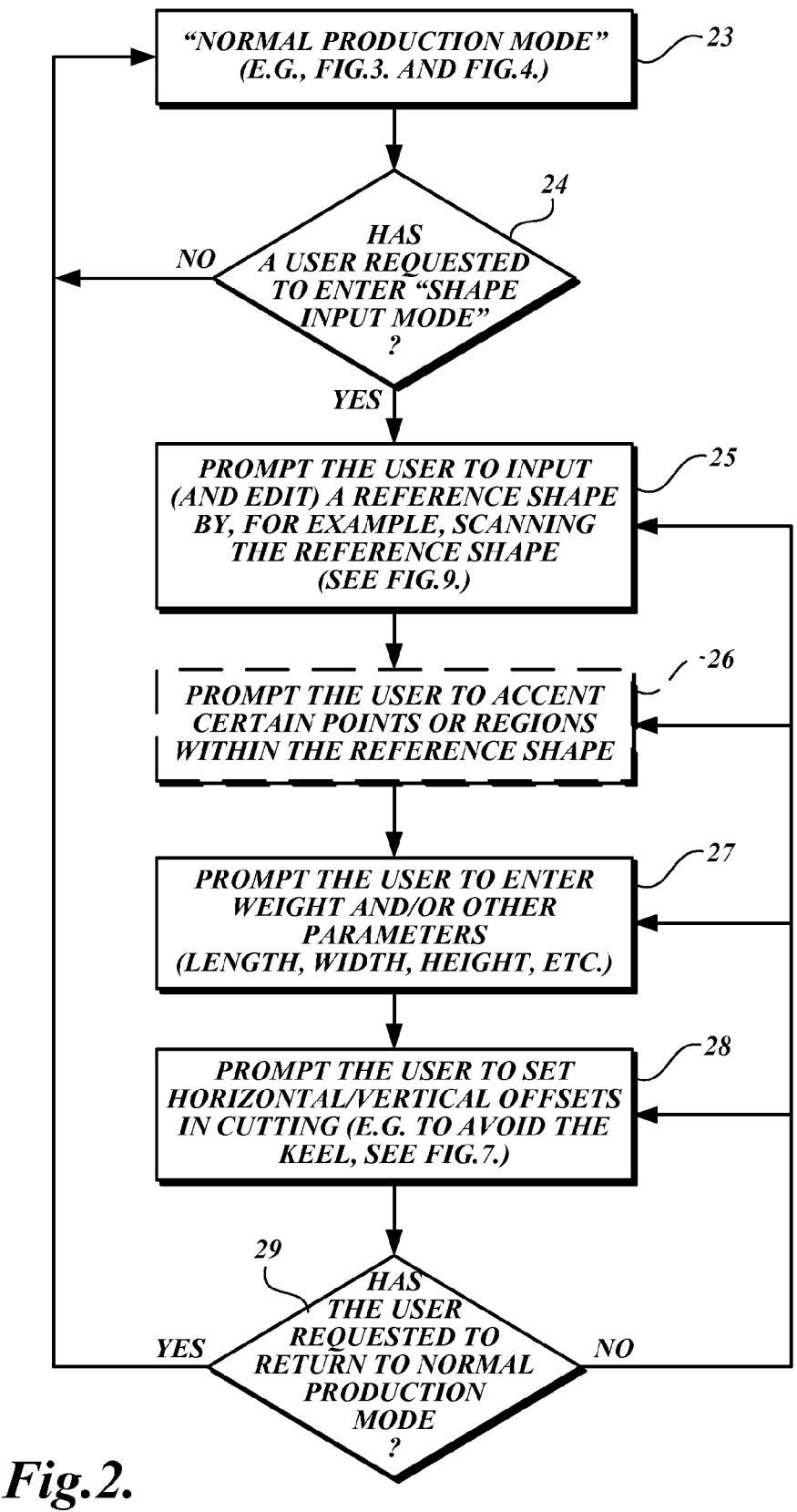
FIG. 2 is a flow chart illustrating the overall process for portioning workpieces into pieces having a specific shape while also meeting any other user-defined parameters/specifications, in accordance with one embodiment of the present invention.
Figure 7:
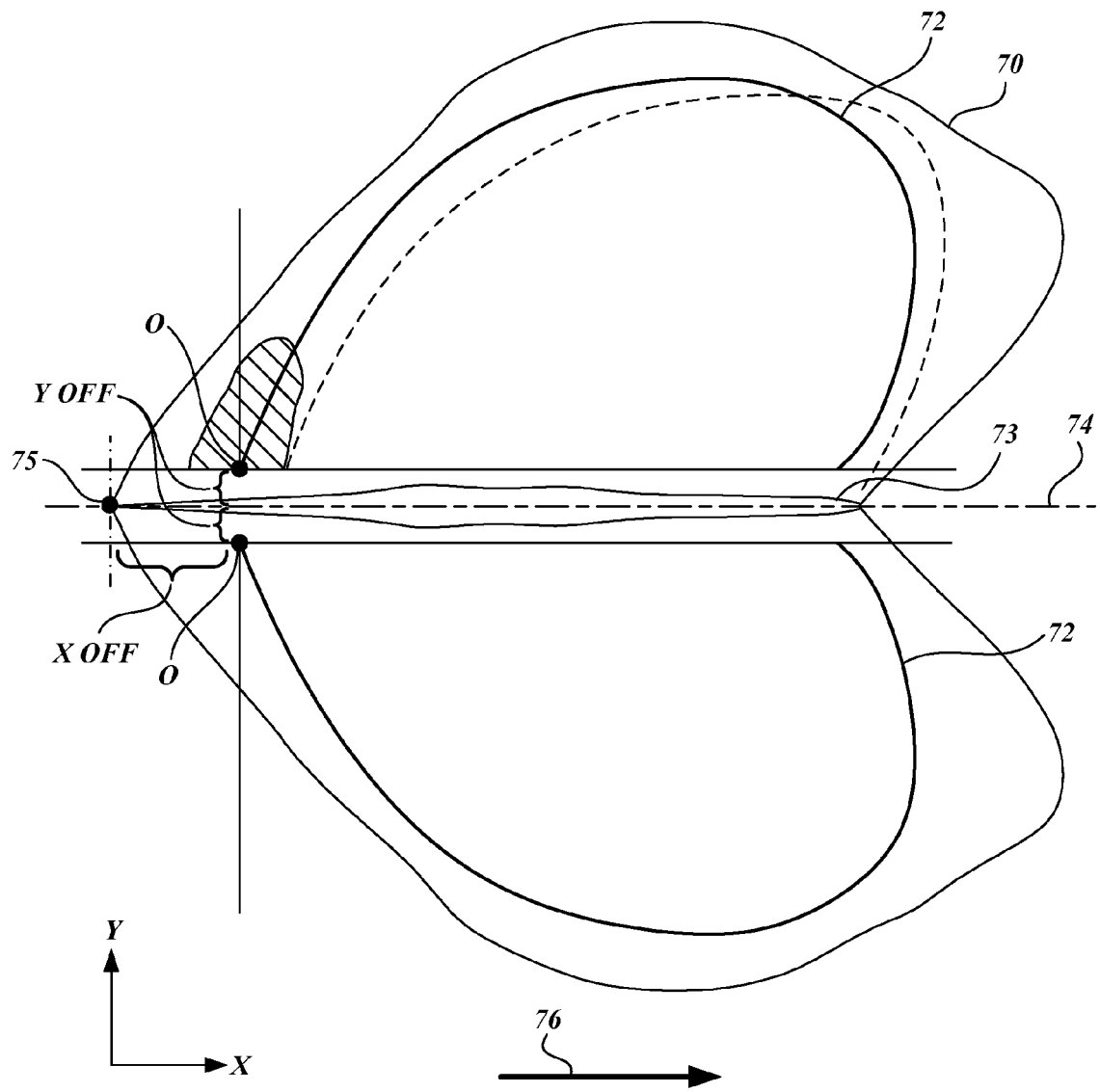
FIG. 7 illustrates a butterfly-shaped chicken breast workpiece, from which two half heart-shaped pieces are to be portioned.
Figure 8A:
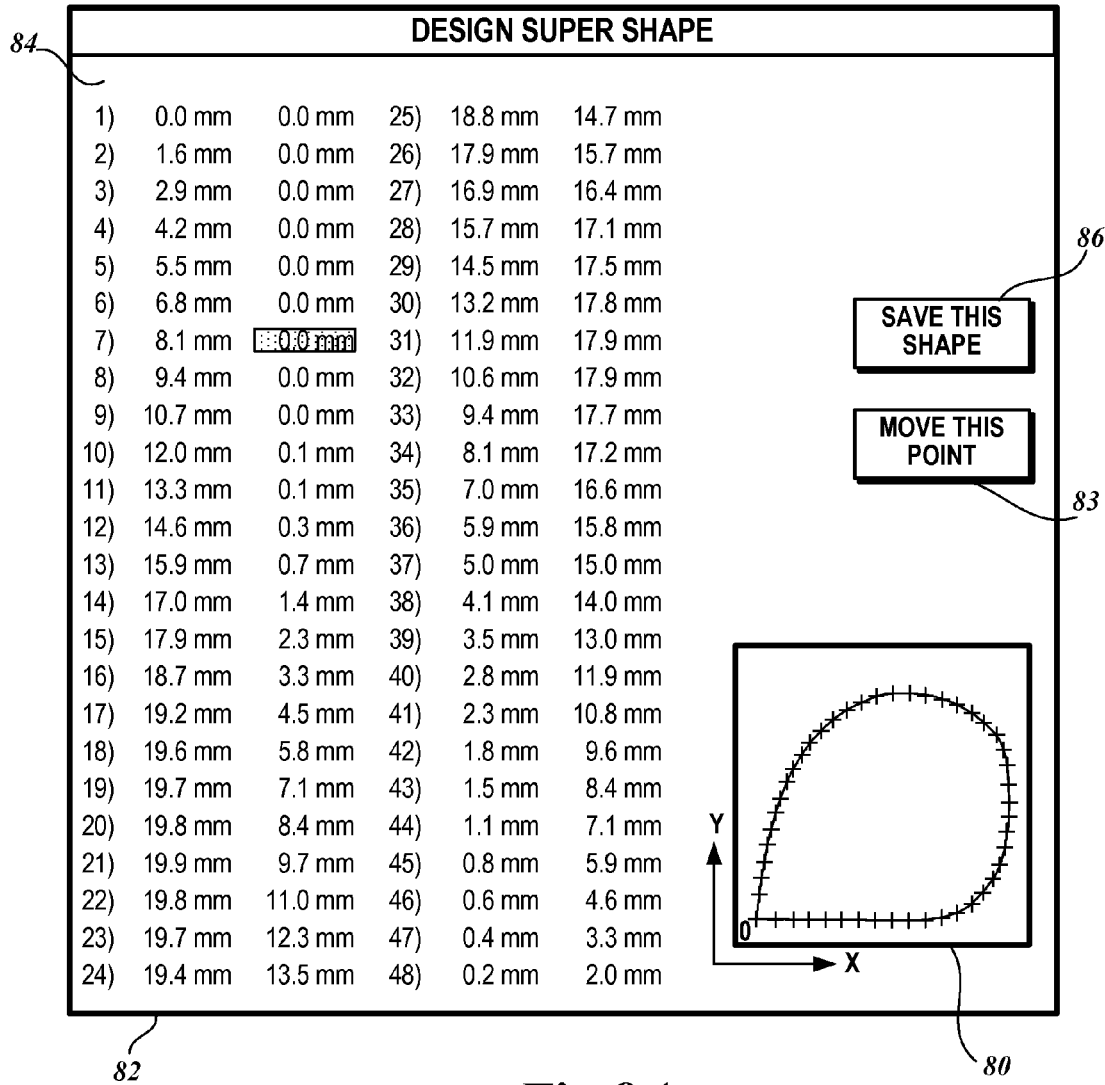
FIG. 8A is a sample screen shot, displayed on a monitor of the portioning system according to one embodiment of the present invention, defining a shape cutting path in a connect-the-dots model.

FIG. 2 is a flow chart illustrating the overall process for portioning workpieces into a specific shape and one or more user-defined parameters and/or specifications, according to one embodiment of the present invention. In step 23, the portioning system 10 is operating in Normal Production Mode. Some examples of routines to be performed in Normal Production Mode will be described in reference to FIGS. 3 and 4 below. In step 24, it is determined whether a user has requested to enter Shape Input Mode. For example, referring additionally to FIG. 1A, the user may request to enter Shape Input Mode by using any suitable input device 20a, for example, by clicking on a "Shape Input Mode" icon displayed on the monitor 20b. If such a request is received, then proceeding to step 25, the system 10 prompts the user to input (and perhaps also to edit) a reference shape, into which workpieces are to be portioned. For example, referring to FIG. 7, suppose that butterfly-shaped chicken breast workpiece 70 is to be portioned to produce one or two half heart-shaped pieces 72. The user may input the reference shape (the half-heart shape in this example) in various ways. For example, the system 10 may prestore several standard shapes, from which the user can select one as an initial template. Referring to FIG. 8A, suppose that the shape shown in a window 80 was prestored in the system 10 and selected by the user. At this point, a shape input/edit screen 82 shows the outline of the selected shape in the window 80 in a connect-the-dots model. The main screen 84 lists the X and Y coordinates of forty-eight (48) points that define the outline of the selected shape. Specifically, listed numbers 1-48 each has a pair of numbers, which show the X and Y coordinates of each point that forms the outline of the template shape shown in the window 80. The first point, which is point O at the lower left corner of the shape shown in the window 80, has the X and Y coordinates of (0,0).

At this point, the user may edit the connect-the-dots model in various ways. For example, the user may select the "move this point" icon 83 on the screen, and select a point, which will then be highlighted (see, for example, point 7 highlighted in the example of FIG. 8A). At this point, the user may use any of the arrow keys provided in any standard keyboard device 20a to move the selected point in X-Y space. For example, pressing the right arrow once will move the point to the +X direction by a certain increment, while pressing the up arrow once will move the point in the +Y direction by a certain increment.

Figure 8B:
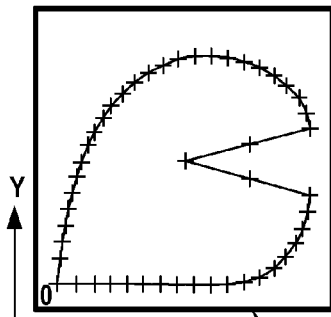
FIG. 8B is a sample screen shot of a shape cutting path, which has been modified from that shown in FIG. 8A, by including a notch into the shape of FIG. 8A.

Alternatively, referring to FIG. 8B, the user may select the X or Y value of the point the user wishes to edit, and then type in the new value directly into the list. For example, in FIG. 8B, the user may select the X and Y values of points 20, 21, and 22 by, for example, highlighting a section 85 on the screen, and then directly enter the new X and Y values to the list. As the user enters the new values, the shape outlined in the window 80 changes to correspond with the new X and Y values of these points. Once all the editing is completed and the user is satisfied with the final shape, the user may select a "save this shape" icon 86 on the screen to save the reference shape into the system memory.

While the above description describes a method of inputting a shape by editing an existing shape selected from a collection of prestored templates, it is also possible to create a new shape "from scratch," for example, by defining the X and Y coordinate values of all the points (e.g., points 1-48 in FIGS. 8A and 8B). This process may be preceded by the user plotting out a desirable shape on graph paper to ascertain X and Y values of the key points of the shape.

Further alternatively, according to one aspect of the present invention, a reference shape may be simply scanned into the system using the system's scanner 16. The method of scanning a reference shape for the purpose of creating a template will be more fully described below in reference to FIG. 9.

In one embodiment, the user-defined shapes may be stored (for example, up to 10 shapes) in the system memory so that the user can later recall any of the previously defined shapes.

Referring back to FIG. 2, after the reference shape has been entered, edited, and saved by the user, in step 26, the user may be further prompted to accent certain points or regions within the reference shape. The user-specified accent points will be used to slightly modify the reference shape (e.g., by moving in or out the accent points) when the shape requirement is not stringent, as will be more fully described below. Then, in step 27, the user is prompted to enter weight and/or other parameters of the final piece to be portioned from the workpiece. For example, the user may specify the maximum and minimum weight values for the final piece, and/or the maximum and minimum values for the length, width, and/or height (or thickness) of the final piece to be portioned from the workpiece. If the user wishes to portion workpieces into an exact weight, the user may set both the maximum and minimum weight values the same. Likewise, if any of the length, width, and height of the final product has to be at an exact value, the maximum and minimum values for that dimension may be set the same.

In step 28, the user is further prompted to set horizontal and vertical offsets to be used in cutting a workpiece. The concept of offset is described in detail in FIG. 7. In this case, from the butterfly-shaped chicken breast piece 70, two half heart-shaped pieces 72 are to be portioned. The chicken breast 70 has the keel 73 running along its center, which most users typically wish to exclude from the final products. Therefore, the user may set a Y-offset value ("Yoff"), which is a distance in the Y direction from a keel line 74 to the cutting starting point O of the half heart-shape 72, so as to avoid the keel 73. The keel line 74 for each product can be readily ascertained by the processor 20 evaluating the image obtained by scanning the workpiece 70. The user may also define an offset in the X direction ("Xoff"), which represents the distance from the trailing edge of the workpiece 70 to the cutting starting point O of the half heart-shape 72, assuming that the workpiece 70 is on a conveyor moving in the direction of an arrow 76. The user may define any desirable X and Y offsets, so as to avoid any undesirable areas in each cutting application.

Referring again back to FIG. 2, in step 29, it is determined if the user has requested to return to Normal Production Mode. If so, the process returns to step 23 and the system starts to operate in Normal Production Mode. Otherwise, the system remains in Shape Input Mode, and the user continues to input and/or edit the reference shape (step 25) and/or define various parameters and offsets (steps 26-28).

Figure 5A:
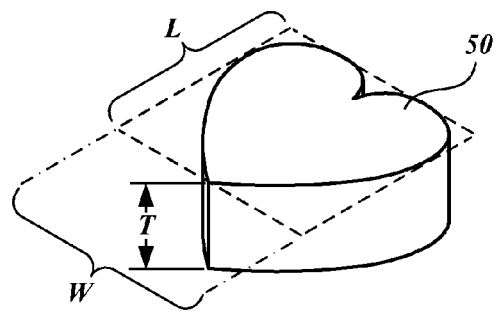
FIGS. 5A and 5B illustrate two cut pieces having the same shape and weight, but having different sizes (weight×length) due to the differences in thickness.
Figure 5B:
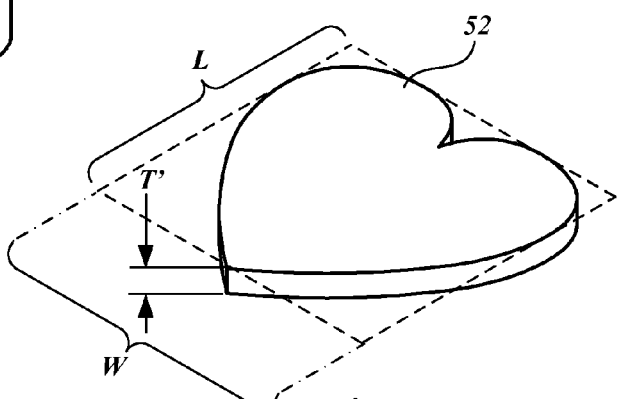

According to one aspect, the present invention is directed to an automatic portioning system to portion workpieces into a weight-specific uniform shape, such as into portions having both specific (e.g., uniform) weight (or weight range) and a specific (e.g., uniform) shape (or shape range), and therefore may be of varying sizes depending on the varying thickness of each workpiece. This concept is schematically illustrated in FIGS. 5A and 5B. In these figures, both pieces 50 and 52 have the same heart shape and also have the same weight; however, because the thickness (height) of the piece 50 is greater than that of the piece 52, the size (width×length) of the piece 50 is smaller than that of the piece 52. The thickness (height) of each workpiece, which may vary amongst multiple workpieces and also within a workpiece itself, is ascertained based on scanning, as described in the background section of the present invention above. In some cases, the thickness of workpieces may be predefined or known prior to their introduction into a system of the present invention. Further, the weight of the original workpiece, as well as the weight of each piece to be portioned from the workpiece, is calculated based on the volume, as ascertained from scanning, as multiplied by the density of the workpiece. The density may be predefined for each type of workpiece, and further may be updated based on the suitable feedback system. For example, referring to FIG. 1A, a weighing station 22 may be provided downstream from the cutter 18 to actually weigh the pieces (not shown in FIG. 1A) portioned from the original workpiece 14. The processor 20 compares the actual weight of the portioned piece with an assumed weight of the piece as previously calculated based on its volume and assumed density, and if the two values differ by more than a predefined amount, automatically updates the assumed density so as to more closely correspond with the actual weight measured at the weighing station 22.

Figure 3:
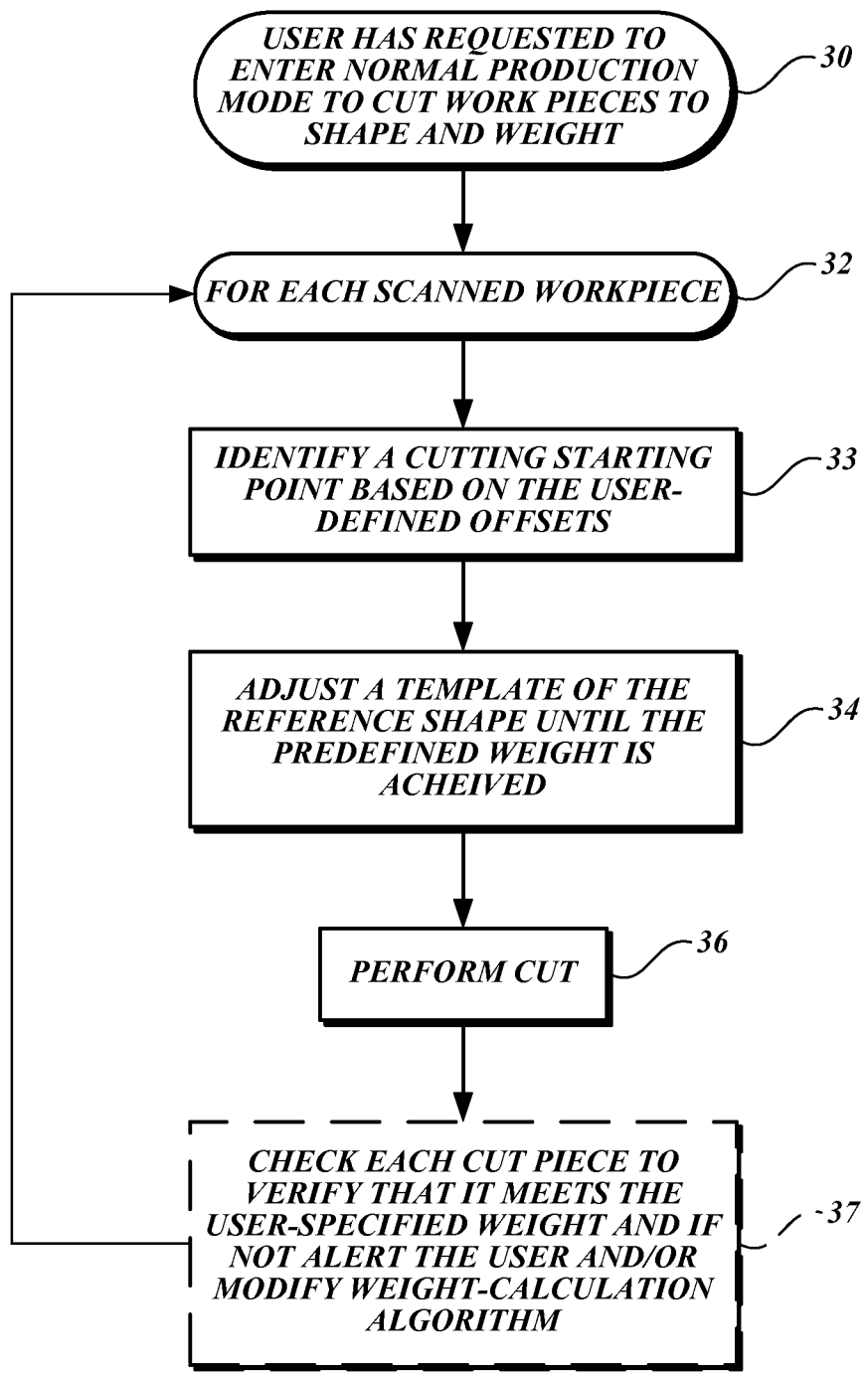
FIG. 3 is a flow chart illustrating the routine performed during Normal Production Mode of the system, in which workpieces are portioned to a specific shape and weight.

FIG. 3 is a flow chart illustrating a routine performed during Normal Production Mode, in which workpieces are to be portioned to a specific shape (or shape range) and weight (or weight range). In step 30, the user requests to enter Normal Production Mode to cut workpieces to shape and weight. Typically, the system 10 operates in Normal Production Mode by default, but entry into Normal Production Mode may be specified by the user, for example, after the user completes the operation in Shape Input Mode. Then, in Normal Production Mode, for each scanned workpiece (step 32), the processor 20 identifies a cutting starting point (see point O in FIG. 7) based on the user-defined offsets. As described above, the processor 20 can analyze the image of each incoming workpiece scanned in by the scanner 16 to identify the keel or any other landmark points, from which the cutting starting point is to be offset.

In step 34, the system automatically adjusts a template of the reference shape, previously specified by the user, until the predefined weight is achieved. For example, the template can be scaled up or down, depending on the varying thickness of each workpiece, in order to achieve uniform weight. This can be accomplished by, for example, proportionately varying the X and Y dimensions of the reference shape on the scanned-in workpiece (whose thickness and density information is known or ascertained) until the desired weight is calculated, while considering any user-defined offsets and also optionally avoiding undesirable product features such as keel, cartilage, defects, bone, and visible fat in the case of chicken and other meat. Alternatively, if the user has previously specified that the final product has to have a specific length, then the shape can be scaled up or down only in the width direction (in the Y direction in FIG. 7) without any change in the X direction, or if the user has previously specified that the final product has to have a certain width, then the template shape can be scaled up or down only in the length direction (in the X direction) without any change in the Y direction.

Further alternatively, the user may specify the amount and/or type of change allowed to the "ratio" between the length and width (e.g., Length/Width) so as to control the automatic adjustment process of a template shape. For example, the user may define that the "Length/Width" ratio may be increased from the ratio L/W of the original template shape, then the shape will be automatically stretched in the "L" direction disproportionately to any change made in the "W" direction so that the ratio L1/W1 of the resulting shape is greater than L/W. As another example, the user may define that the "Length/Width" ratio may be decreased from L/W of the original template shape, then the shape will be squashed in the "L" direction disproportionately to any change made in the "W" direction so that the ratio L2/W2 of the resulting shape is less than L/W. These types of automatic shape adjustments result in a shape that is somewhat disproportionately modified from the original template shape but that still meets a predefined weight requirement.

In some applications, the weight requirements may be relaxed and the workpieces may be cut into portions having approximate weight within a user-specified range. Likewise, the length and/or width requirements may also be relaxed depending on each application.

In step 36, the processor 20 controls the cutter 18 to cut the workpiece according to the cutting path determined in step 34 above. Then, optionally in step 37, each cut piece may be weighed, for example, at the weighing station 22 in FIG. 1A, to see if it meets the user-specified weight (or weight range), and if not, the system alerts the user and/or modifies the weight-calculation algorithm used by the system, for example, by updating the assumed density of the workpiece.

Figure 6A:
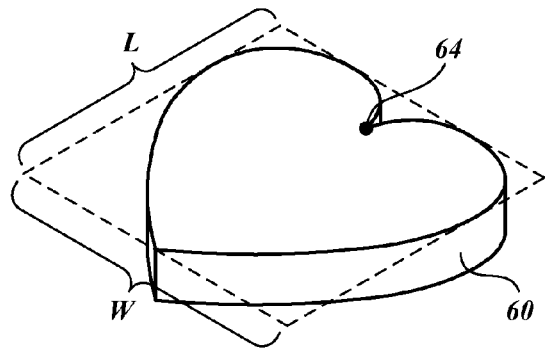
FIGS. 6A and 6B illustrate two cut pieces, wherein the shape of at least one of the pieces has been manipulated in a controlled manner so that the resulting pieces have the same weight and size, and also have generally similar shapes.
Figure 6B:
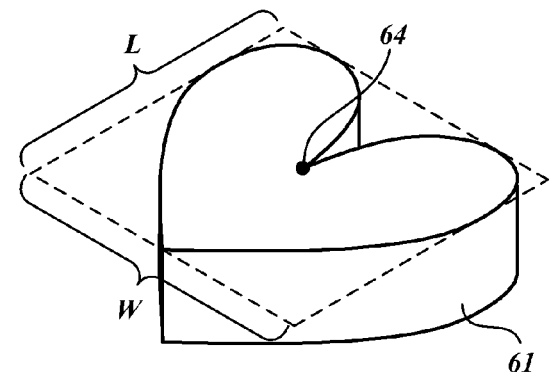

In some cases, a user desires a workpiece to be cut into only approximate shapes having both uniform weight and uniform size (width×length, measured along the plane of the conveyor) In these cases, the automatic portioning system of the present invention may permit a user to accent certain points or regions of the desired shape, and these user-specified points and regions are moved in and out (as opposed to the entire outline of the shape) until the desired weight is achieved, while also meeting the size requirement and keeping the shape generally the same as the original shape. FIGS. 6A and 6B schematically illustrate this concept, in which both portions 60 and 61 have the same weight (or weight range) and the same size (or size range) as defined by W×L (width× length). Suppose that the shape of the portion 60 is the original desirable shape, with an accent point 64 defined by the user. Suppose also that the portion 61 is thicker than the portion 60, as shown, and thus, to meet the same weight and size (width×length) requirements as the portion 60, it is necessary to somewhat modify the shape of the portion 61. As illustrated, this can be achieved by moving the accent point 64 in, so as to reduce the shape surface area of the portion 61 while maintaining the shape generally similar to the original shape. This adjustment method is suitable when the requirements for the weight and size are rather stringent, while the requirements for the shape are somewhat more relaxed.

Figure 4:
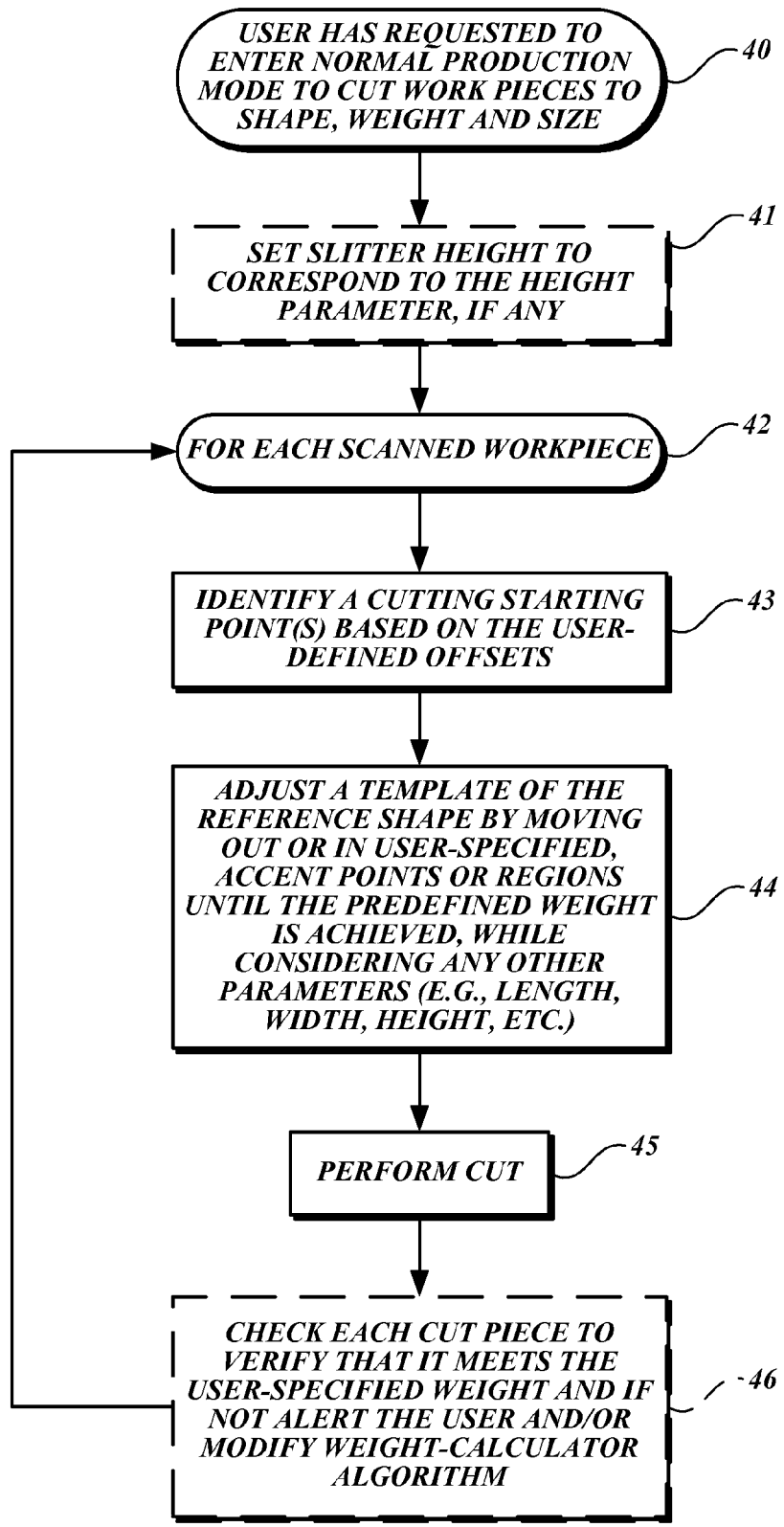
FIG. 4 is a flow chart illustrating the routine performed during Normal Production Mode of the system, wherein workpieces are portioned into a specific shape, weight, and size.

FIG. 4 is a flow chart illustrating the routine performed during Normal Production Mode to cut workpieces into size, weight, and "approximate" shape (the shape is allowed to vary somewhat), as described above in reference to FIGS. 6A and 6B (step 40). In step 41, the height of a slitter (not shown) is set to correspond to the height specification defined by the user, if any. In step 43, for each scanned workpiece (step 42), a cutting starting point to portion out a piece from the workpiece is identified based on the user-defined offsets. In step 44, a template of the reference shape, previously entered by the user, is adjusted by moving in or out any user-specified accent point(s) or region(s) until the predefined weight (or weight range) is achieved, while also considering any size related parameters (e.g., length, width, etc.). As before, the adjustment process may be carried out while considering the user defined offsets and avoiding any undesirable product features such as keel, cartilage, defects, bone, visible fat, etc. In step 45, the system then operates the cutter 18 to execute the portioning based on the adjusted template. In step 46, as before, the actual cut piece may be weighed to verify if it meets the user-specified weight, for example, by using the weighing station 22 in FIG. 1A. If the cut piece does not meet the user-specified weight, the user may be notified of the fact, and further, the system may modify its weight-calculation algorithm, for example by correcting the assumed density of the type of workpieces. The use of accent points or regions permits the user to control and constrain any changes that may be allowed to the desired shape.

FIGS. 3 and 4 above describe exemplary uses of the system for portioning workpieces to shape and weight, or to shape, weight, and size, respectively. Various alternative uses of the present system are possible, as will be apparent to one skilled in the art. For example, in one embodiment, the system of the present invention may be used to cut workpieces into a specific shape and size, regardless of weight, while optionally avoiding undesirable material, such as keel, defects, and visible fat. Further alternatively or additionally, the system may be used to cut remaining trim from the portioning process into further desired products, such as strips and nuggets. In any of the various embodiments, workpieces are cut into portions having a specific or approximate shape, while also meeting one or more other parameters/specifications as defined by the user.

Figure 1B:
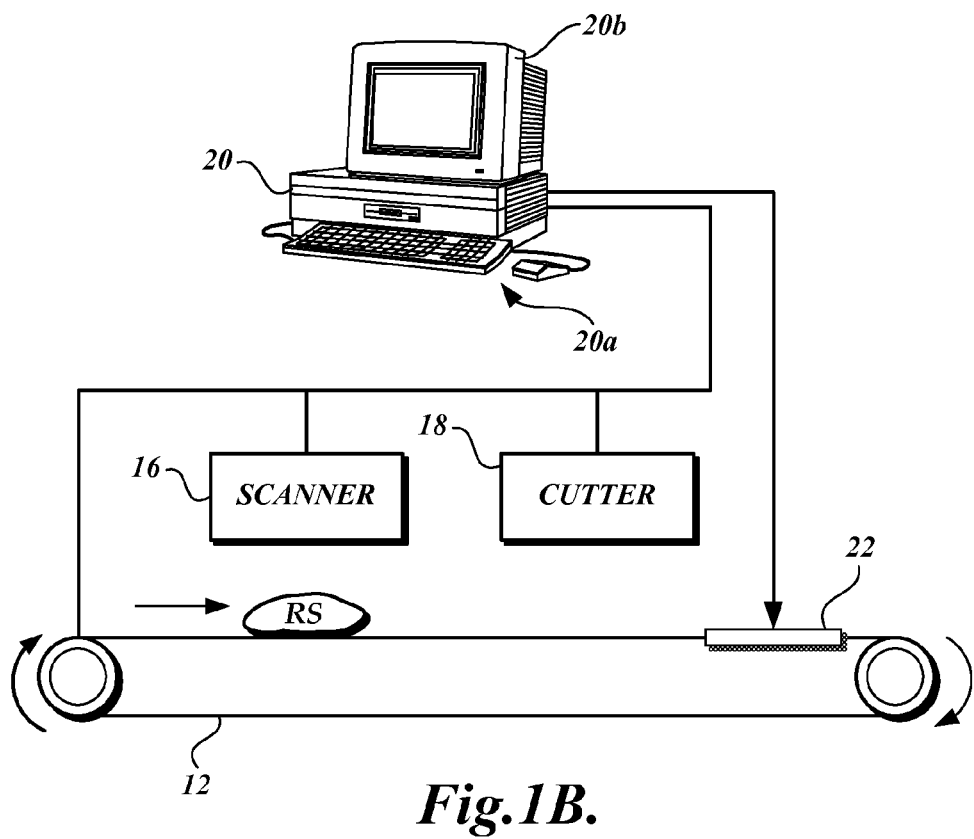
FIG. 1B illustrates the system of FIG. 1A, which is operated in Shape Scanner Mode to scan in a user-provided reference shape (RS)
Figure 9:
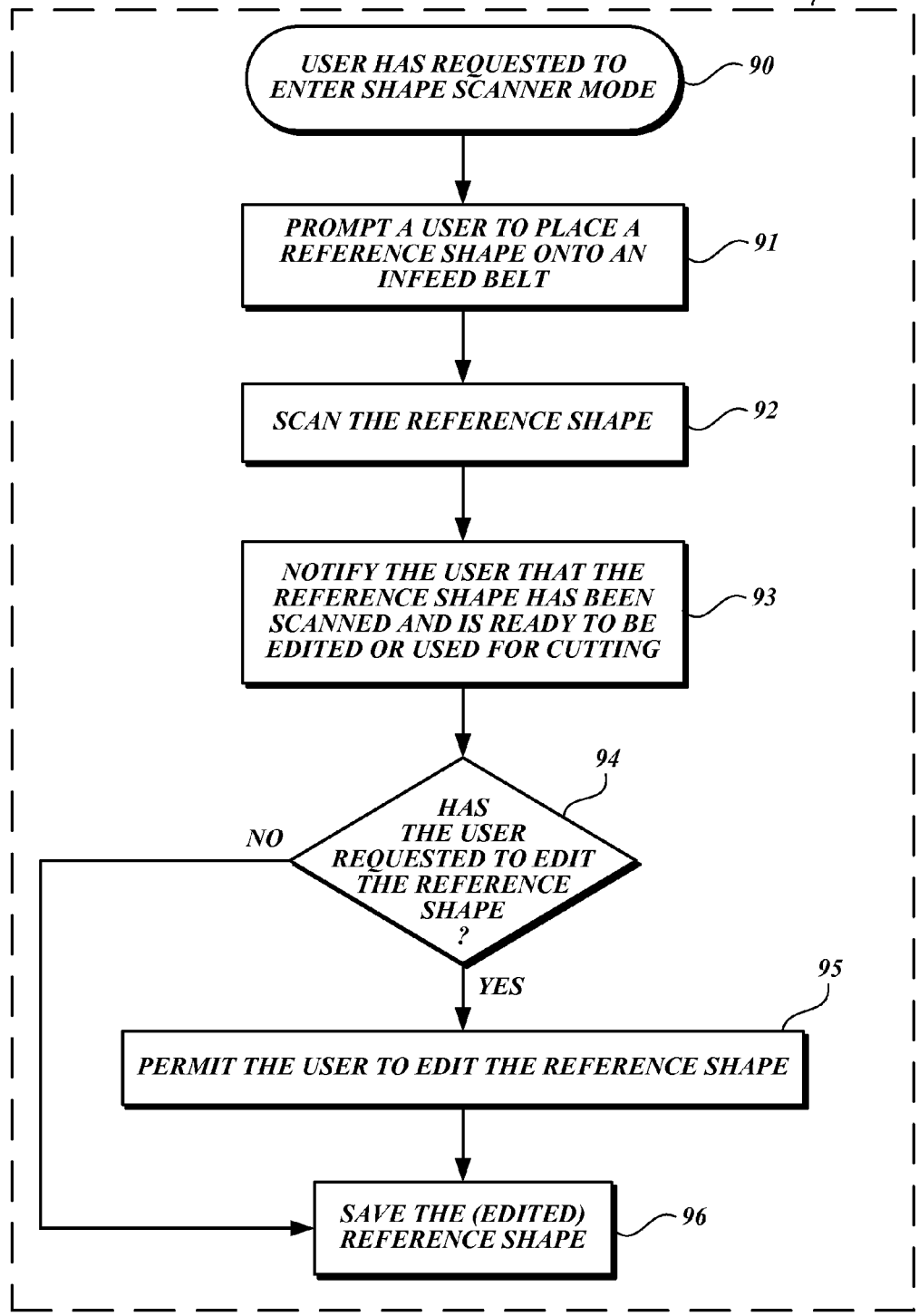
FIG. 9 is a flow chart illustrating the routine to be performed during Shape Scanner Mode, which is a special case of Shape Input Mode.

FIG. 9 is a flow chart illustrating the routine to be performed during Shape Scanner Mode, which is a special case of Shape Input Mode. Therefore, the flow chart of FIG. 9 generally replaces steps 24 and 25 of FIG. 2. In step 90, using any suitable user interface, the user requests to enter Shape Scanner Mode. (For example, by selecting the "Shape Scanner Mode" on-screen button on the monitor 20b of the system.) In step 91, the user is prompted to place a reference shape, made of any suitable material, onto an infeed belt of the system. The reference shape may be an actual product cut by scissors by the user, or may be a template shape cut out from cardboard, or made of clay, Play-Doh®, etc. Referring to FIG. 1B, once the user places the reference shape RS onto the conveyor, the scanner 16 scans in the reference shape (see step 92 of FIG. 9). Still referring to FIG. 9, in step 93, the system notifies the user that the reference shape has been scanned in and is ready to be edited or used for cutting. In step 94, it is determined whether the user has requested to edit the reference shape. If so, proceeding to step 95, the system permits the user to edit the reference shape, as previously described in reference to FIGS. 8A and 8B, above. Then, in step 96, upon user confirmation, the reference shape is saved into the system memory. Once the reference shape is saved, in various exemplary embodiments, the system instantly returns to Normal Operation Mode to use the saved reference shape in all subsequent cutting operations.

As will be apparent from FIG. 2, the user can interrupt the normal operation of the automatic portioning system 10 anytime to scan in and edit the desired shape template. The desired shape is stored into memory and will be used to control the downstream cutting/portioning equipment of the portioning system to cut the workpieces into the desired shape. In step 95 of FIG. 9, as before, the user may accent certain points or regions within the scanned-in shape for the purpose of controlling any changes allowed to the reference shape.

Accordingly, the present invention offers various methods and systems for automatically portioning workpieces into a certain or approximate shape, while also satisfying one or more other parameters defined by the user, such as weight and size. The final determination of the shape to be cut from each workpiece is further constrained by user-set values such as position offsets and avoidance areas (e.g., keel, bone, fat, etc.). Thus, in accordance with the present invention, a completely automatic shape cutting is possible, and further can be optimized, to provide for efficient cutting.

Referring to another aspect of the present invention, in order to economically produce portions of a workpiece, it is necessary to convert most of the incoming workpiece into acceptable portions. Starting with the problem of cutting one portion from each workpiece, from the foregoing description, consider a "cookie cutter" of a given shape, which has the ability to zoom in and out, thereby to increase or decrease the size of the cut portion of the workpiece to achieve desired weight range. In addition, as discussed above, consider that the aspect ratio (length/width) can vary as well. In viewing the workpiece to be portioned, the "cookie cutter" could be positioned on the workpiece in various locations along two displacement axes, as well as about a rotational axis. If the "cookie cutter" is placed over a thin area of the workpiece, it will be necessary to "zoom out" to a larger size in order to achieve the desired weight. If the "cookie cutter" is placed over a narrow area of the workpiece, it will be necessary to make the shape longer and narrower to fit. In order to cut the proper weight of the workpiece while avoiding defects—fat, cartilage, too thick areas, and too thin areas—it may be necessary to alter the aspect ratio, 2-axes position, and angle, all at the same time.

When trying to best fit or place the desired shape of a portion on a workpiece, as noted above, it can be useful to actually have the shape of the desired end portion extend off the edge of the workpiece in one or more areas. The shape of a cut portion will thus differ from the desired ideal shape to the extent that the cut shape extends past the edge of the workpiece. In some cases, a slight compromise on shape in this regard may provide the best acceptable overall solution. This deviation in shape can be quantified by several different methods.

It will often be the case that the incoming workpiece is large enough that more than one acceptable portion can be cut from it. More value to the processor will thus be provided than always only cutting one portion from the workpiece. As mentioned above, the placement of a desired end portion shape on a workpiece can be extended to the placement of two portions as well, although this is a more complex problem.

Most processors employ more than one parameter of an acceptable end portion. It is possible to consider more than one parameter (shape, size, weight, thickness, etc.) of an end portion while analyzing each incoming workpiece, and to select the end portion that is most valuable in some respect. It is also possible when placing multiple desired end portions on one incoming workpiece to have different parameters considered for each of the multiple end portions.

Also, as noted above, some types of workpieces, such as boneless chicken breast "butterflies," are essentially two similar pieces separated by a line of symmetry. In this case, each half can be treated essentially as an independent workpiece.

The decision process in determining where to locate desired portions on a workpiece can be thought of in terms of directly controlled parameters (and specifications) and indirectly controlled parameters (and specifications). For example, in algebra, Y is said to be a function of X or Y=F(X). The directly controlled parameters (specifications) are the independent variables, such as "X." The indirectly controlled parameters (specifications) are the dependent variables, such as "Y," and result from the input of the directly controlled parameters (specifications). In the context of the present invention, directly controlled parameters (specifications) represent actions that occur when the workpiece is processed, e.g., portioned. Having made cuts (or simulated the cuts) of the workpiece, the resulting portions have properties that constitute the indirectly controlled parameters (specifications).

In accordance with the present invention, it is possible to consider the effect of meeting (or controlling) user-specified directly controlled parameters (specifications) and other resulting parameters (specifications) that are not directly controlled, prior to cutting. Specifically, the present invention further offers methods that may be used when a workpiece is being processed by cutting, trimming, slicing, etc., and it is desired that the resulting cut, trimmed, sliced, or otherwise processed product has particular characteristics not directly controlled by the cutting, trimming, slicing, or other process.

Examples of directly controlled parameters and specifications include:
1. Portion specification(s):
Shape of the piece or portion;
Zoom range (size) of shape in one dimension of the two-dimensional shape of the piece or portion;
Zoom range (size) of shape in the other dimension of the two-dimensional shape of the piece or portion;
Zoom range in two dimensions (size) simultaneously (enlarge or decrease size of shape of the piece or portion).
2. Positioning (location) of portion to be achieved from workpiece:
Cross belt (X direction) range of the shape of the piece or portion relative to some references;
Down belt (Y direction) range of the shape of the piece or portion relative to some references;
Angular orientation range of the shape of the piece or portion relative to some references.
3. Number of pieces or portions to be achieved from the workpiece.
4. Angle of water jet cutter nozzles.

As noted above, the portioning and/or trimming of a workpiece can be carried out by using high-speed liquid water jet cutters. While most cutting with high-speed water jet cutters is carried out with the cutters in a vertical orientation and thus disposed normally or transversely to the workpiece, it is possible to use the high-speed water jet cutters that are set at a fixed angle from vertical, or actively control the angles of the cutters from vertical. If the angle of the water jet cutter is actively controlled, then such angle would be one of the user-controlled parameters.

Examples of indirectly controlled parameters and specifications (properties of the portions where cutting, slicing, trimming, etc., has been simulated):
1. Weight of the piece or portion.
2. Shape conformance of the cut, trim, slice, central portion, including any natural edges.
3. Average thickness of the piece or portion.
4. Maximum or peak thickness of the piece or portion.
5. Roughness or flatness, as in variability of thickness of the piece or portion.
6. Length of the piece or portion.
7. Width of the piece or portion.
8. Size (length and/or width of the piece or portion
9. Plan-view area of the piece or portion.
10. Amount of fat in the piece or portion.
11. Program errors.
12. Down-belt cutter travel required.
13. Holes, tears, concavity, etc., in the piece or portion It is to be understood that some of these examples of indirectly controlled parameters can also be utilized as directly controlled parameters, such as, for example, weight, size, length, and/or width.

In many applications where a combination of two or more characteristics (or parameters/specifications) of the finished product are sought (e.g., shape, weight, size, length, width, etc.), it may be that one or more of these characteristics are directly controllable, and others are indirect results of the cutting, trimming, slicing, etc., process. For example, in trimming of chicken breasts, the shape and weight of the resulting trimmed piece may be directly controllable, as described above in reference to FIG. 3, but the thickness of the resulting piece may not be directly controlled, and thus may vary among multiple final products.

According to a further aspect of the present invention, where one or more characteristics cannot be directly controlled and yet are the results of controlling the directly controllable characteristics, the directly controllable characteristics are selected so as to optimize the indirectly-controlled characteristics. Specifically, in circumstances where more than one option exists for values of the directly controllable characteristics, and where a simulation can be performed to assess the resulting indirectly-controlled characteristics prior to actually performing the cutting operations, then it is possible to achieve target values or ranges for all characteristics. The present invention provides a method of accomplishing this, where the indirectly-controlled characteristics are measured and classified into one of several categories.

In the example of portioning chicken breasts, let the first step in the process be to capture a three-dimensional image of the chicken breast using the scanner 16 connected to the processor 20, as described above. The processor 20 will then have stored in its memory a 3D model of the chicken breast that can subsequently be used to simulate the effects of various cut patterns.

Assume that one set of acceptable target shape and weight is designated as SW1 and a second set as SW2, and one acceptable thickness range is designated as T1 and a second as T2. Assume also that the following three combinations of shape and weight requirements and thickness ranges are acceptable in the finished cut product.

$$SW1+T1$$

$$SW1+T2$$

$$SW2+T2$$

According to one example, the method proceeds as follows:
First, using the 3D model in processor memory, the effects of cutting to shape and weight requirements SW1 are simulated.
Second, using the new product boundary resulting from the simulated cuts according to SW1, and referring again to the 3D model, the thickness statistics (average thickness, for example) within the boundary are calculated.

Third, if the thickness as simulated is within the limits of range T1 or T2, then appropriate signals are generated to actually perform the simulated cut pattern and classify/sort the resulting cut product into a category corresponding to either SW1+T1 or SW1+T2, as appropriate.

Fourth, if the simulated thickness does not fall within either range T1 or T2, using the 3D model, the effects of cutting the workpiece according to the shape and weight requirements SW2 are simulated, and the thickness within the resulting boundary is evaluated and compared to the allowable limits (for SW2 only range T2 is acceptable). If the evaluated thickness is within the range, signals are issued to perform the simulated cut pattern according to SW2+T2.

Fifth, if neither cutting to requirements SW1 nor SW2 results in a product within the acceptable thickness range(s), then no solution exists.

In the above example, rather than using discrete values for a target shape and weight, a range of values can be used for these characteristics and the above process used to seek an optimum solution within these value ranges.

Figure 10:
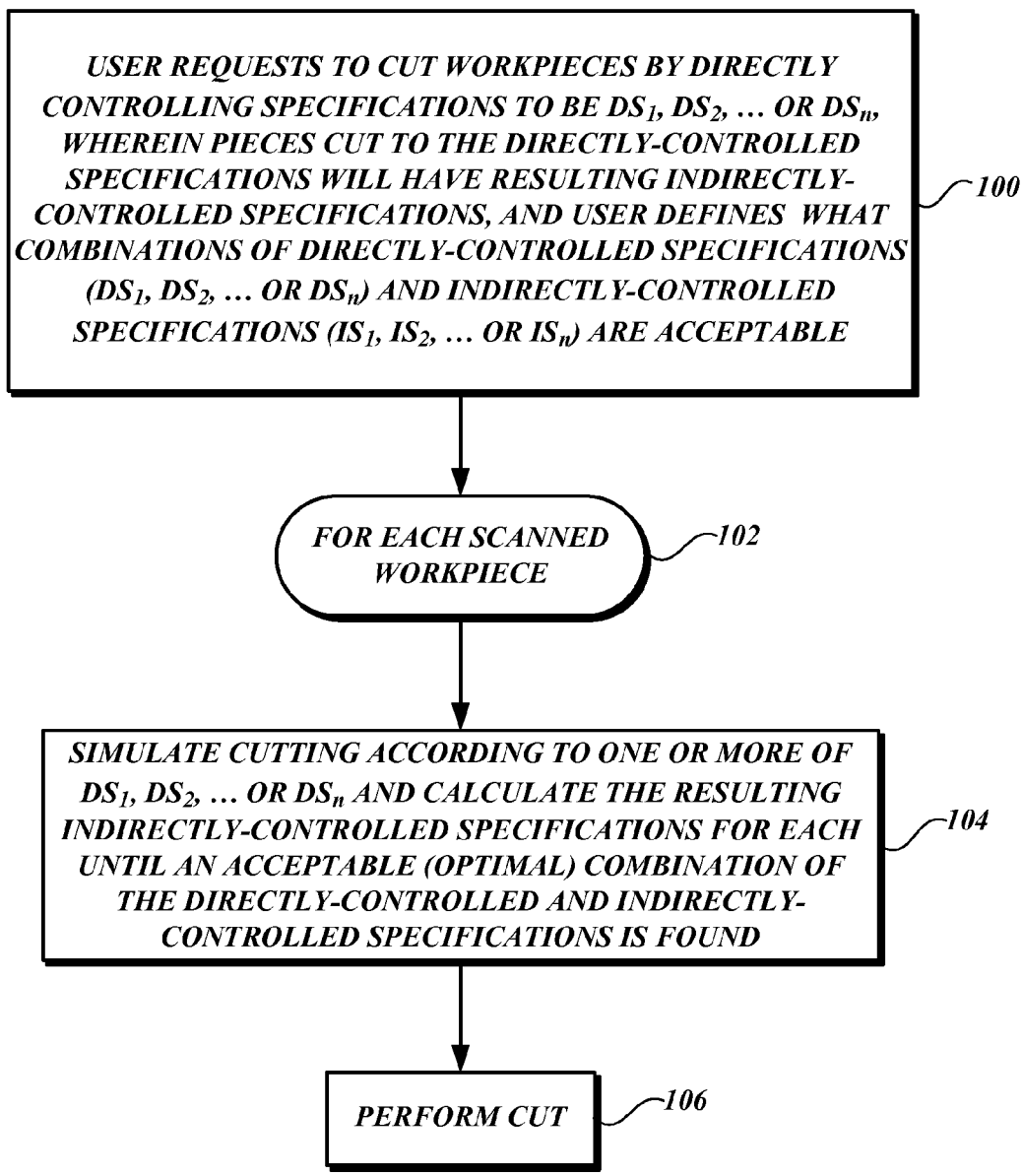
FIG. 10 is a flow chart illustrating a routine for evaluating the effects of cutting to certain specifications on the final product characteristics, which are not directly controlled by the portioning process, prior to performing an actual cut, according to a further aspect of the present invention.

FIG. 10 is a flow chart illustrating a general process of evaluating what effects cutting a workpiece according to certain parameters/specifications will have on the cut piece's other characteristics, which are not directly controlled by the cutting process, to ensure that the final piece will have desirable indirectly-controlled characteristics. In step 100, a user requests to cut workpieces by directly controlling certain parameters (e.g., shape, weight, position, angular orientation, number of portions to be obtained from the work product, etc.) so that they fall within one of multiple acceptable categories, such as by ensuring that one of multiple specification requirements DS1, DS2, . . . or DSn is met. Further, the user requests that the pieces cut to the specification requirements DS1, DS2, . . . or DSn need to have one or more resulting indirectly-controlled characteristic(s) (e.g., thickness, weight, shape, conformance, etc.), IS1, IS2, . . . or ISn.

Then, for each scanned workpiece (block 102), in block 104, cutting the workpiece according to one or more of the directly-controlled specifications (DS1, DS2, . . . or DSn) is simulated, and the resulting indirectly-controlled specification(s) is calculated. For example, cutting according to the specification DS1 is simulated, and the indirectly-controlled specification (e.g., thickness) resulting from cutting to the specification DS1 is calculated. If an acceptable combination of DS1, DS2, . . . or DSn and IS1, IS2, . . . or ISn is found, then the acceptable combination may be selected as the combination according to which the subsequent cut is to be performed. Various methods for selecting one combination are possible. For example, as with the previous example, it is possible to continue the simulation and calculation process until the first acceptable combination is found.

Alternatively, a value function (or its negative/opposite, a cost function) may be used to rank multiple alternative solutions. (Value and/or cost functions are also referred to herein as optimization functions.) According to this variation, cutting to the multiple specification requirements (DS1, DS2, . . . or DSn, in this example) is simulated, and the resulting indirectly-controlled specification(s) (e.g., thickness) are calculated for each simulation and compared to the acceptable indirectly-controlled specification(s) (IS1, IS2, . . . or ISn). If multiple acceptable combinations exist, a suitable value function is used to select the most preferable combination.

After the acceptable, optimal combination of DS1, DS2, . . . or DSn and IS1, IS2, . . . or ISn is found, then proceeding to step 106, the portioning system is used to perform an actual cut according to the selected combination of the directly-controlled and indirectly-controlled specifications.

As a further aspect of the present invention, each of the characteristics, i.e., parameters/specifications, both direct and indirect, can potentially have an acceptable range rather than just a single acceptable value. It is possible to define a "cost" function that has a value of zero at the center of each range of each specification, with an increasing "cost" as the simulated values of the parameters deviate from the center of the specification range. Further, a weighting factor can be applied to the "cost" from each of the parameters. Finally, the "weighted costs" are combined, such as by addition, to give a "total cost." Thus, for each combination of the directly controlled characteristic and resulting indirectly controlled characteristic, there is a single "total cost" amount associated with the simulated cutting/trimming/slicing, etc., result. It is to be understood that the term "cost" as used herein refers to the negative or opposite of the word "value" discussed above. These terms are related in the sense that with respect to a particular specification, an increase in the "cost" corresponds to a decrease in the "value."

The cost function definition could take almost any form, including one-sided definitions where the characteristic can never be above or below a threshold, and the target (zero cost) value is something other than the middle of a range. An example of this exists from packaged grocery goods where it is legally required that a container not contain less than the labeled amount. However, it is clearly in the interest of the product producer to be as close as possible to the labeled amount.

Examples of three cost functions that can be used include:
1. The cost increases with deviation from the range midpoint, and continues increasing for parameter values beyond the range;
2. The cost increases from a deviation from the range midpoint, with "hard" limits (for example, large step function cost increase) at the range limits;
3. There is no cost associated with values within the range, with "hard" limits at the range limits The "total cost" number is used with a multi-dimensional optimization technique, such as the "Gradient Descent" minimization algorithm, to find an optimal choice of directly controlled parameters/specifications. Within a limited number of steps or iterations, it is possible to find the optimal solution without having to consider all of the perhaps thousands of potential combinations of directly controlled parameter values. Examples of non-linear algorithms similar to Gradient Descent include the Gauss-Newton method, the BFGS method, and the Levenberg-Marquardt method. Other algorithms or analysis methods that may be utilized in this regard include, for example Nelder-Mead method, differential evolutions methods, genetic algorithms, and particle swarm optimization. Of course, in the range of interest, linear algorithms and analysis techniques can be used to arrive at an optimum choice of directly controlled parameters It is to be understood that in the above description of identifying optimum directly-controlled and/or indirectly-controlled parameters and specifications, a cost function analysis has been utilized. However, it is to be understood that the negative or opposite concept of a value function could be utilized instead. In this case, a multi-dimensional maximization technique or algorithm would be utilized to arrive at optimal directly and/or indirectly controlled parameters/specifications.

There can be dependencies between the parameters that can be exploited to simplify the solution methods. An example of this is aspect ratio, length and width, each being a parameter despite their obvious dependence. The user may only need to specify length and width ranges, with the aspect ratio being "worked out" in the software.

There are instances in which parameters are chosen as directly controlled parameters. Two examples are set forth below. To simplify the present discussion, the examples include only one portion to be derived from a workpiece and only one parameter/specification for the portion.

As a first example, the primary method is to start with a specified shape and as directly controlled parameters zoom in or out in one dimension, such as width, zoom in or out in a second dimension, such as length, move the shape across the workpiece, move the shape lengthwise of the workpiece, and rotate the shape to various angles. Even though weight is one of the main parameters that may be targeted, this analysis allows weight to be an indirectly controlled parameter, which depends on various degrees of zooming and moving about the workpiece to locate an acceptable thickness for the portion. This is considered to be an efficient analysis method.

An alternative methodology is to begin with a specified shape and, as directly controlled parameters, utilize weight, aspect ratio (ratio of length over width), movement of the shape up and down the length of the workpiece, movement of the shape across the width of the workpiece, and rotation of the shape to various angles. In the background, in a separate algorithm, the zoom (enlargement or reduction) on the shape is adjusted, until a specified weight or weight range is achieved. In this alternative method, "zoom" is then an indirectly controlled parameter.

Figure 11:
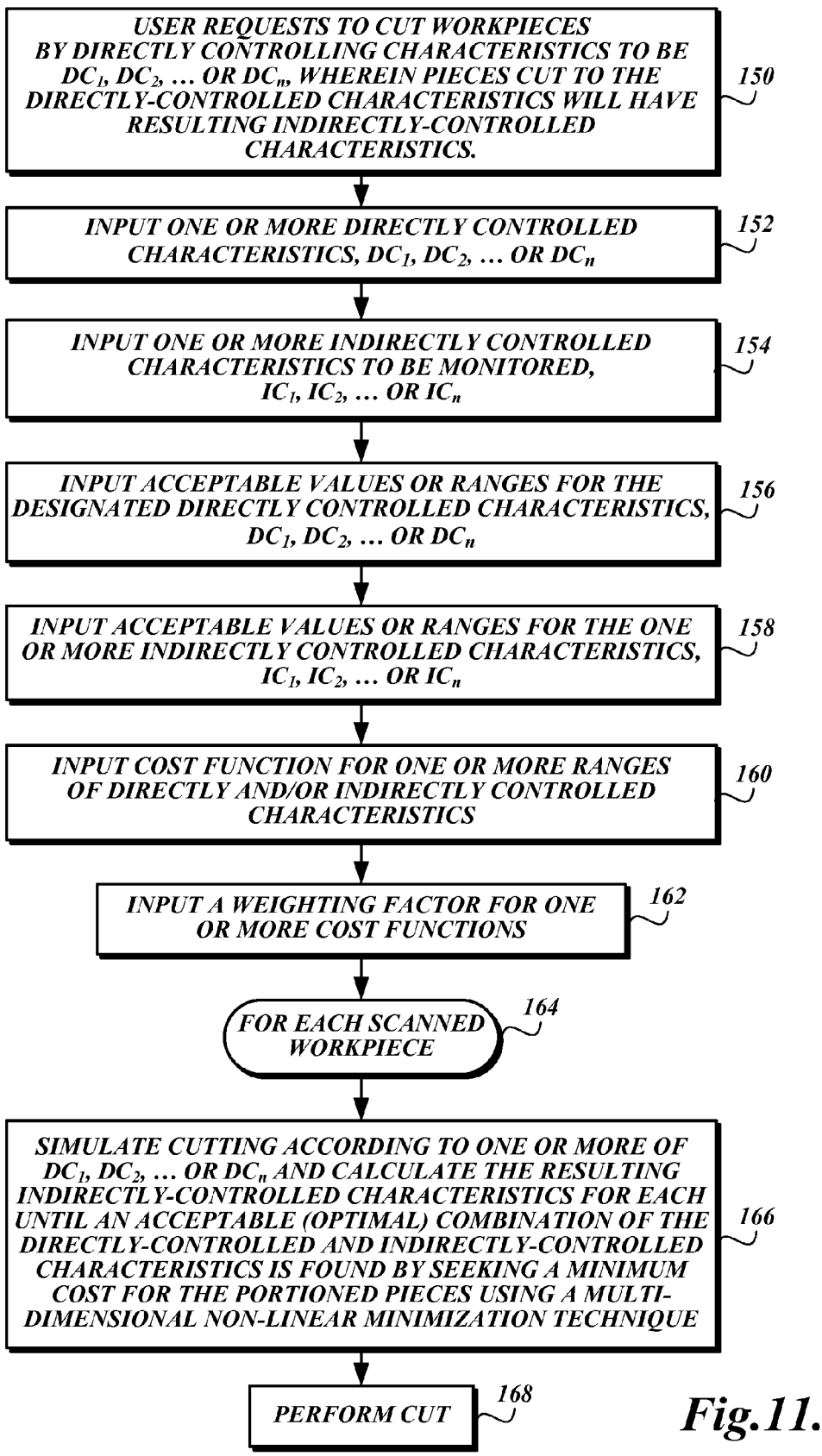
FIG. 11 is a flow chart illustrating a routine for evaluating the effects on indirectly controlled parameters or specifications of a workpiece based on selected directly controlled parameters or specifications prior to performing an actual cut, according to another aspect of the present invention.

FIG. 11 is a flow chart illustrating one example of a process or method for determining how to cut a workpiece according to one or more directly controlled characteristics (parameters or specifications) to achieve desired one or more indirectly controlled characteristics (parameters or specifications) of the resulting portioned piece. Although the example pertains to cutting a workpiece, other processes may be applied to the workpiece, either in conjunction with cutting or in lieu of cutting, such as trimming the workpiece, slicing the workpiece, or performing one or more other operations on the workpiece.

In step 150, a user requests to cut the workpieces by directly controlling certain characteristics (parameters or specifications), for example, shape, shape range, position of the portion on the workpiece, or number of portions to be derived from the workpiece, so that the resulting portions meet the characteristic (parameter/specification) requirement(s) or the characteristic ranges $DC_1, DC_2, \ldots$ and/or $DC_n$ are met.

In the process, in step 152, the user inputs one or more directly controlled characteristics $DC_1, DC_2, \ldots DC_n$.

Next in step 154, the user inputs one or more resulting indirectly-controlled characteristics $IC_1, IC_2 \ldots IC_n$ (parameters or specifications) to be met by the portions that meet the characteristic requirements of $DC_1, DC_2, \ldots$ and/or $DC_n$.

Figure 12:
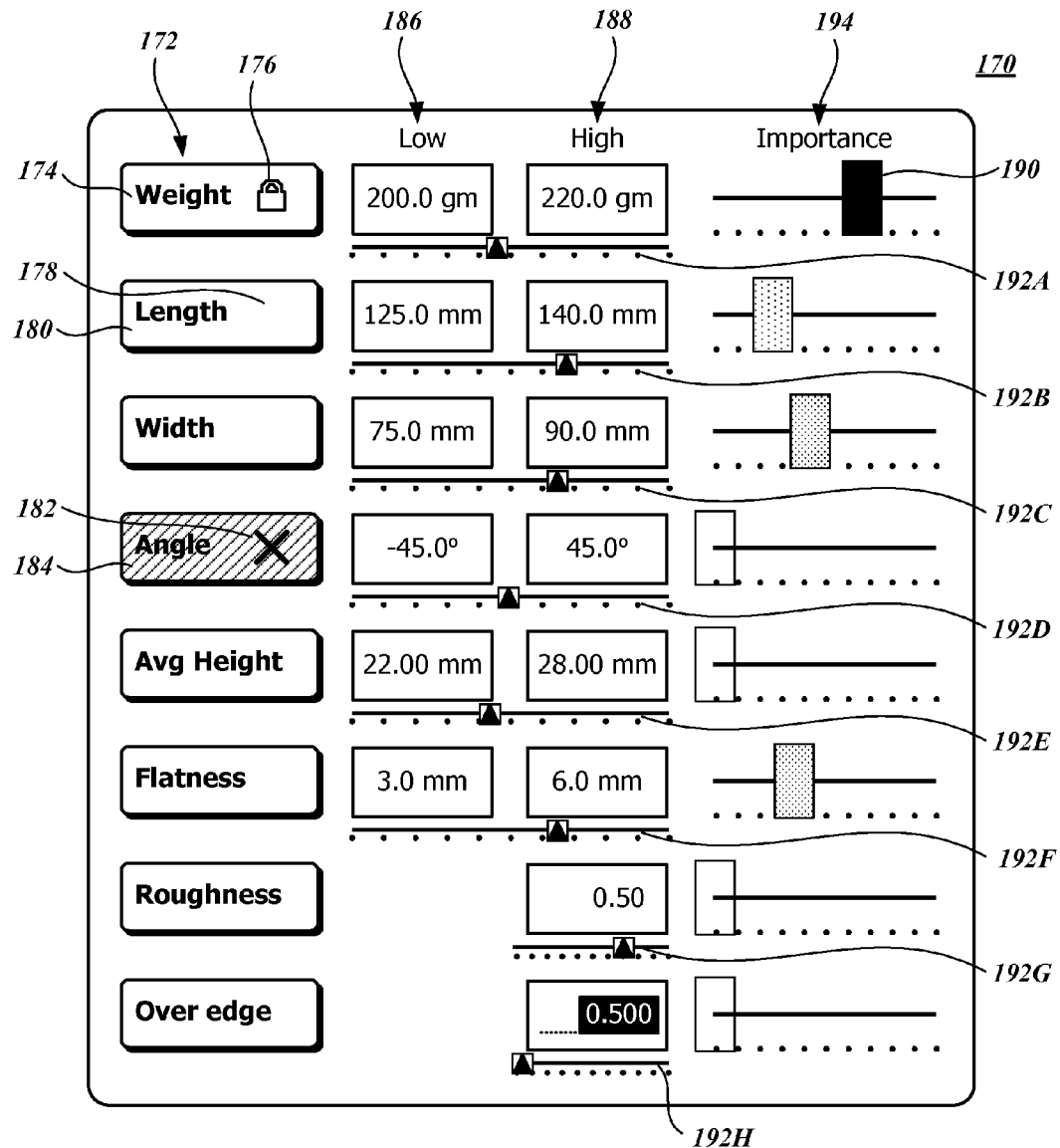
FIG. 12 illustrates a graphical user interface that may be employed with the systems and methods of the present invention, including that illustrated in FIG. 11.

Next at step 156, the user inputs acceptable ranges of values for the directly controlled characteristics (parameters or specifications) $DC_1, DC_2, \ldots$ and/or $DC_n$. As discussed below, this can be performed using a graphical user interface, for example, as shown in FIG. 12. This example varies from the example above in that in the present example, specification ranges are specified by the parameter being utilized. Nonetheless, it is to be understood that a specific value can be specified for one or more of the parameters being utilized.

Next in step 158, acceptable values or ranges for the one or more indirectly controlled characteristics $IC_1, IC_2 \ldots IC_n$ (parameters or specifications) are inputted. Again, this can be accomplished by using the graphical user interface of FIG. 12.

Next in step 160, optimization functions can be assigned to one or more of the directly controlled and/or indirectly controlled characteristics (parameters or specifications). As discussed above, the optimization function can be in the form of a cost function. The cost function can have a value of zero at the center of the range of each specification, with an increasing cost as the simulated value of the parameter in question deviates from the center of the specification range. Also, as discussed above, the cost function definition can take many other forms, including one-sided "definitions" where parameters can never be above or below a threshold value, and the target (zero cost) value is other than at the middle of a range.

Next at step 162, a weighting factor can be assigned to one or more of the costs of a parameter, thereby to establish that some cost factors are more important or less important than other cost factors. The weighing of a cost factor can also be inputted by utilizing the graphical user interface illustrated in FIG. 12.

Then for the scanned workpiece (block 164), in block 166, simulating the cutting of the workpiece occurs according to the one or more directly-controlled characteristics (parameters or specifications) ($DC_1, DC_2, \ldots$ and/or $DC_n$), and the resulting indirectly-controlled characteristics $IC_1, IC_2 \ldots IC_n$ (parameters or specifications) are calculated or determined using, for example, processor 20. For example, cutting according to characteristic $DC_1$ is simulated and the indirectly-controlled parameter IC (e.g., weight) resulting from the cutting to the characteristic $DC_1$ is calculated. This may be carried out by seeking to minimize the "total cost" of the resulting portion using a multi-dimensional minimization technique. In this manner, a minimum cost or an acceptable cost can be achieved, typically after a discrete number of calculation iterations. This eliminates the need to perform calculations for every possible acceptable directly-controlled characteristic(s) $DC_1, DC_2, \ldots$ and/or $DC_n$.

After an acceptable and/or optimal combination of directly controlled parameters and specifications and/or indirectly controlled parameters and specifications is arrived at, then, at step 168, the portioning system is used to perform cutting according to the selected combination for the directly-controlled and indirectly controlled parameter(s)/specification(s).

As discussed above, optimization functions (cost value functions) can be assigned to one or more of the directly controlled and/or indirectly controlled characteristics (parameters or specifications) to achieve certain desired end results, for example to obtain the highest yield from the workpiece in terms of utilization of the workpiece. Other end goals may include portioning the workpiece to obtain the highest value from the workpiece. In this regard, certain final pieces portioned from the workpiece may be more valuable than others. For example, cutting a section of the workpiece into a sandwich portion may be more valuable than cutting the same section of the workpiece into nuggets or strips. Another goal might be to fulfill a customer's order. For example, a customer may have ordered a certain number of sandwich portions, a certain number of strip portions, and a certain number of nugget portions. As such, the optimization functions that are applied to the directly controlled and/or indirectly controlled characteristics may be designed with this in mind Moreover, under the present invention, it is possible to simultaneously run multiple optimization function analyses on the workpiece when seeking desired end results. Based on such analyses, it may be that characteristics of the most desirable of the various analyses results will be chosen, or perhaps the characteristics corresponding to the first analysis that results in an acceptable solution may be chosen as the strategy for portioning the workpiece. As another alternative, the characteristics that result in the larger number of end pieces of desired characteristics or that provides a desired set of final pieces that meet the desired characteristics might be chosen.

The portioning method and system of the present disclosure also may be operated with a plurality of optimization function analyses running at the same time on the workpiece, to simply meet the directly and indirectly-controlled parameters. For example, one analysis may be seeking to position two final portions per workpiece, and if an acceptable solution with respect to the final pieces is not achieved, then the workpiece may be analyzed for positioning one final piece on the workpiece. An alternative analysis may be attempting to place two 65 gram final pieces on the workpiece or two 105 gram final portions on the workpiece. Perhaps the two 65 gram portions would result in a low yield (resulting in significant trim or waste), and the 105 gram portions may result in a high yield or perhaps the two 105 gram portions would not fit on the workpiece. Thus, different sets of specifications are being applied to the workpiece at the same time using different optimization functions.

FIG. 12 shows a portion of a graphical user interface (GUI) 170 that may be used in conjunction with the present invention. In the GUI of FIG. 12, the column of parameters 172 extending down the left side of the GUI (weight, length, width, angle, etc.) are parameters (mostly indirectly controlled) that contribute to the cost function. By repeatedly pushing the touch screen buttons, such as weight 174, the weight value toggles through having a padlock symbol, such as 176 on button 174, no symbol 178 on button 180, or color an "X" symbol 182 on pink colored button 184, which correspond to the different cost function descriptions noted earlier. The no symbol 178 on button 180 corresponds to the first cost function described above, the padlock symbol 176 on button 174 corresponds to the second function described above, and the "X" 182 on pink colored button 184 corresponds to the third cost function described above.

The columns in FIG. 12 labeled "low" 186 and "high" 188 contain user-settable values of the minimum and maximum value per product specifications of the end products. The horizontal lines 192A through 192H, each with a triangular shape disposed thereon, show a short-term average value of recent settings so that the user can visualize the process of the present invention that is occurring. The actual values being achieved, as well as the set range for the parameters and the weighting coefficients, can be retained by the processor being utilized, for example, processor 20, and displayed to the user using a GUI on, for example, output device 20b or other display, such as a tablet (not shown). This data can be shown in list format or in various graphical formats that show the distribution of that data over time or over recent work products. Also, statistical analysis of the data can be carried out and displayed. Such statistical information might include, for example, mean, medium, and standard deviation values. Such information can be analyzed and displayed to show how well the desired parameters and specifications are being met as well as what trade-offs are taking place to arrive at the final pieces portioned from the work product. It will be appreciated that the foregoing information would be very valuable to have available during the portioning of work products, including if the value, range, and/or importance of one or more directly controlled and/or indirectly controlled parameters are changed.

The rectangularly-shaped sliders 168 located under the "Importance" header 194 let the user adjust the weighting coefficients in the optimization function for individual parameters. The system of the present invention seeks to keep the specifications within bounds, particularly for the parameters that are given the greater importance. However, algorithms cannot "create" input portions that do not exist given the parameters and specifications specified. Thus, for example, if the thickness of the workpiece is too thin throughout the entire workpiece such that within the length and width limits it is not possible to achieve the desired weight, some other solution will have to be sought.

In the example of FIG. 12, the Weight parameter is set to be near the center of the range (see 192A), but the Length and Width parameters (see 192B and 192C) are above the center of their ranges because the workpiece is too thin. The Weight value is closer to the center of the range than the Length and Width values because Weight was given a greater importance. The shape that is being zoomed and moved about the workpiece is specified in another part of a GUI.

In FIG. 12, specific parameters may be considered in portioning a workpiece. Not all of these parameters need be considered in each instance that workpieces are being portioned. Also, other sets of parameters may be used in conjunction with a portioning system or machine. Also, it is anticipated that the system operator will set the specification ranges in columns 186 and 180 as well as the weighing level (Importance) column 194. Moreover, these settings may be changed quite often, for example, to adjust for changes in the physical attributes or types of workpieces being processed.

In some situations, such as end portions to be placed in a "family pack" of retail meat packages, there is little desire for close weight control of the portions. In such an instance, the weight setting along the "Importance line" may be moved all the way to the left, and some other parameter's importance moved up the scale (to the right).

Another situation with a different need for weight control is when an adaptive slicer follows a portioner. In that situation, the portioner computer plans for having the slicer bring the weight to the correct level so that the importance of the Length and Width parameters would increase and the Weight simply needs to be greater than or equal to the desired final weight.

The disclosure of the present application also includes being able to automatically "tune" the weighting coefficients or parameters. As noted above, the weighting coefficients are useful in both seeking to "center" parameters within a specification range as well as optimizing or seeking to make the best choices when all of the characteristics (specifications) cannot be met. In essence, the automatic tuning function seeks to make the analysis process of the present disclosure function as best as possible in relationship to the specification ranges that have been denominated in light of the physical properties of the workpieces to be portioned. In the automatic tuning process, the actual results from portioning work product becomes the function that is seeking to be optimized.

In the automatic tuning process, the only user or human inputs are the ranges for the desired specifications. The present method and system seeks to "best center" the chosen specifications within the selected ranges, and to minimize the variations of the specifications in light of the actual workpieces being portioned. Since during the portioning process there is not the opportunity to actually manually bias a specification range based on the physical characteristics of the work product, if a particular specification is particularly important, the operator/user typically will narrow the specification range for the characteristic in question.

In overall strategy, the automatic tuning system automatically adjusts the importance ratings in an effort to seek to minimize the normalized error in all of the selected specifications (parameters) together over the population of the actual workpiece being portioned. If, for example, the workpiece simply physically cannot achieve the center point of a particular specification, the automatic tuning system seeks to minimize the total error of all of the parameters by adjusting the importance rating of the particular specification in question to accommodate the fact that the workpiece cannot meet this specification, or cannot meet the center point of this specification.

Many different algorithms can be utilized to achieve automatic tuning. For example one such algorithm focuses on using the same cost minimization algorithm that is used for locating final pieces on the workpiece. The cost in this instance is related to the deviation of the last certain number of workpieces from the centers of the desired specifications. The minimization algorithm adjusts the importance ratings (directly controlled characteristics) that minimizes a cost function. This cost function takes all of the parameters, normalized to the specification ranges selected, for each of the workpieces and assigns a cost as a function of the distance from the center of the normalized specification range that is achieved Initially, specification ranges may be either manually input or simply set at the middle of the desired range. Because of variability of workpieces, the cost functions are evaluated as an average of at least several, and perhaps up to for example 50 workpieces. Thus, automatic tuning is often a somewhat deliberate process.

With respect to automatic tuning, if, in utilizing the present disclosure, fairly small final pieces are to be placed on a fairly large workpiece, and the thickness of the workpiece is compatible with the desired specification ranges for length, width, and weight of the final pieces, then there is not much need for automatic tuning of the weighting characteristics. The chosen algorithm for positioning the final pieces on the workpiece likely will be successful. However, as larger and larger final pieces are attempted to be positioned on smaller and smaller workpieces so as to achieve less waste or less trim, then achieving the center of all of the desired specifications becomes more difficult. It is this situation in which automatic tuning of importance or weighing parameters can be of assistance. Also, automatic tuning can accommodate for variations in the workpiece that occur over time as well as variations of workpieces due to originating from different sources.

The above discussion has noted several complexities that can exist in using the present system and method in actual production situations. Applicants note that the extent of the complexities existing in production situations can vary widely. Some of the common production situations in terms of portions derived from a single workpiece (or "double" workpiece consisting of two or more sections defined by a physical parameter of the workpiece, such as a chicken breast butterfly divided by the breast keel include, for example:

1. One portion derived from a workpiece or workpiece section using one specification.

2. One portion derived from a workpiece or workpiece section using more than one specification.

3. Two portions derived from a workpiece or workpiece section, each with the same specification.

4. A combination of the three options above, depending on the options that are derivable from the incoming workpiece or workpiece section.

5. One normal sized portion derived from the workpiece or workpiece section, plus numerous small portions (for example, nuggets or strips) that utilize most of the remaining workpiece. The multiple small portions can be viewed as a set, rather than individual small portions.

6. Two portions of two different specifications derived from a workpiece or workpiece section with specified general locations for each portion so that production personnel can identify which portion corresponds to which location.

7. Two portions using two or more different specifications derived from the workpiece or workpiece section with the portions obtained from the workpiece or workpiece section at whatever locations best meet the parameters/specifications.

In the forgoing the reference to "specification(s)" also includes one or more overall specification(s), which of course may consist of several sub-specifications or parameters, such as length, width, size, thickness, weight, etc.

It will be understood that the foregoing are examples only and that other production situations are possible and can be accommodated utilizing the present invention. Also, it is to be understood that references to "workpieces" in the present application, including in the claims, may also refer to sections of a workpiece that are defined by physical features, or otherwise, of the workpiece In addition to the parameters and specifications noted above, there are other parameters and specifications that could be utilized in conjunction with the present system and method. For example, if the production situation consists of two or more portions derived from a single workpiece, there are specific requirements that may be desirable. One such requirement would be to locate the portions on the workpiece so that most of the trimming required of the workpiece occurs at one location. In this situation, perhaps the two or more portions would be located toward one end of the workpiece. Another potential specific requirement may be maximizing the thickness of the trim from the workpiece for later use in other purposes.

Another strategy for deriving two or more portions from a workpiece includes utilizing initial or "seed" locations for the two or more portions at specific locations on the workpiece. For example, when two portions are to be derived from a workpiece, the portions can be "seeded" at locations at opposite ends of the workpiece. Thereafter a first step of the production methodology or algorithm can be applied to one potential end portion, then the same step applied to the second potential end portion using a completely separate "run" of the algorithm. This alternating process can be continued until optimum locations for the potential end portions are found. If at some point in the process the two potential end portions overlap each other, when the cost minimization algorithm is carried out, a very high "cost" penalty could be assessed for such "crossing." The concept of this strategy is to have two independent minimization processes occurring at the same time, with the only interdependence being a cost penalty for "crossing" of the potential end portions.

A variation of the foregoing methodology is to simply double the number of directly controlled parameters/specifications to include lateral and longitudinal positions, rotational position, and two zoom directions (length and width) for both of the potential end portions. In this situation, a single algorithm can be used to minimize a cost function that includes the costs components from both end portions together and the directly controlled parameters/specifications include the ones from both end portions. Initial assumptions about the directly controlled parameters/specifications (position, angle and two-dimensional zoom) for each of two end portions) in a workpiece are made. The cost function is evaluated based upon both directly controlled and indirectly controlled parameters/specifications. The minimization algorithm then suggests new values for the directly controlled parameters/specifications. The cost function is evaluated and the minimization algorithm suggests further improvements to the directly controlled parameters/specifications. This process continues until some threshold of convergence or maximum number of steps (part of the algorithm) is achieved. In sum, for the two end portions, one combined set of directly controlled parameters/specifications are used which position and zoom the two end pieces, and one cost function evaluates the combined attributes of the two end portions. Also, the one algorithm determines what values of the directly controlled parameters/specifications are to be tried next in the analysis process until an acceptable solution is reached. Of course, other directly controlled parameters/specifications in addition to or in lieu of those mentioned above can be used in this feature or aspect of the present method and system.

Figure 13:
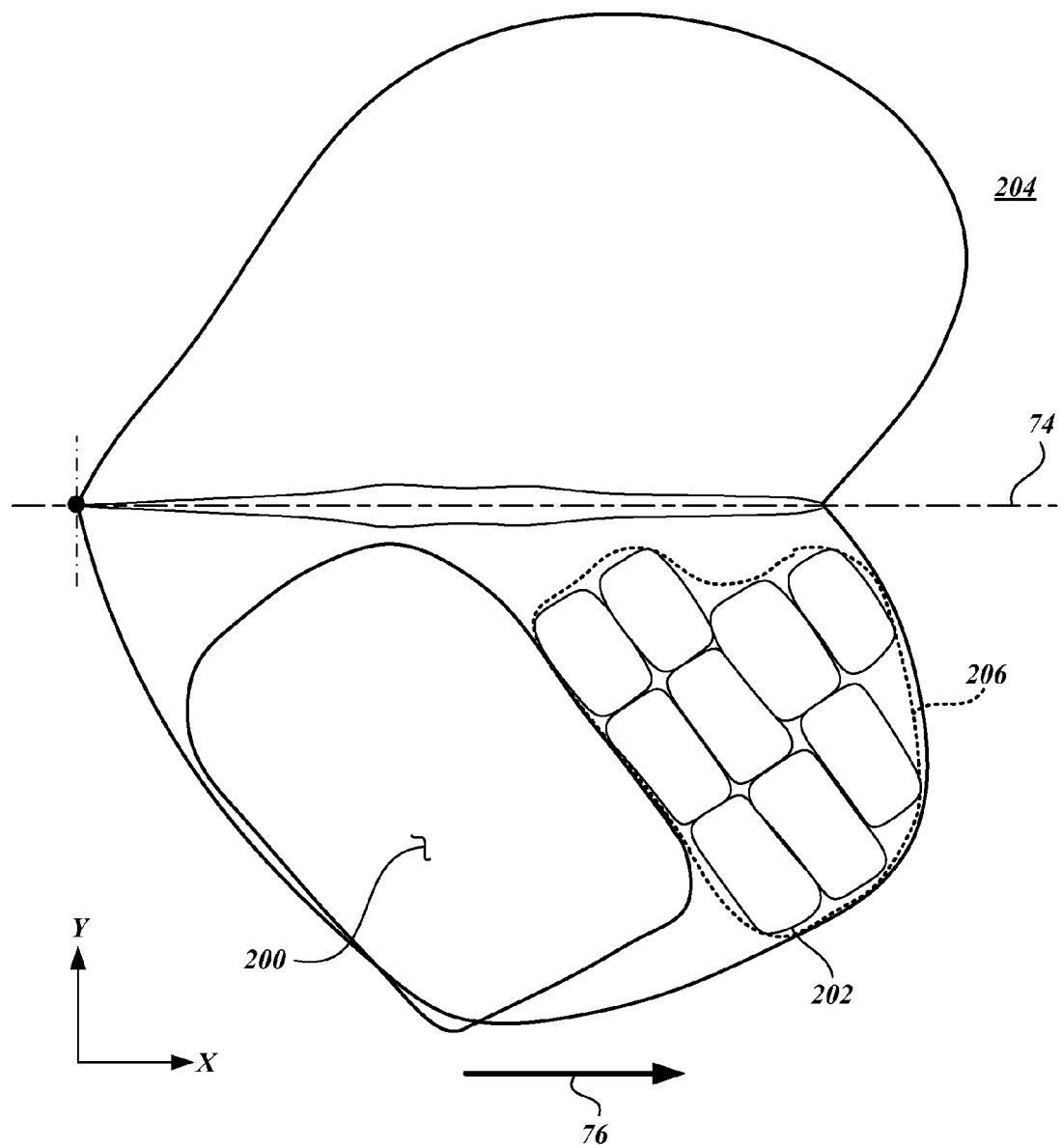
FIG. 13 is a schematic view of a workpiece from a regular size end piece and collection of smaller end pieces (considered as a collection defining a second portion) to be portioned from the workpiece.

As alluded to above and as shown in FIG. 13, a potential strategy for seeking one normal size portion 200 plus many small portions 202 from a workpiece 204 is to treat the small portions (for example, nuggets or strips) as a collection constituting a second portion 206. A second separate algorithm is utilized to divide this second portion 206 into individual nuggets or strips 202. The individual small portions 202 can be simple rectangular shapes or of more complex shape—for example, a shape having a curved or non-linear side that borders against the adjacent portion or even automatically nests against the adjacent portion, thereby conforming to the adjacent portion. This strategy could provide a maximum amount of work product for use as nuggets or strips as well as minimizing the amount of cutting required to produce the nuggets and/or strips.

A variation of the foregoing potential strategy is to define a composite larger portion on a workpiece that consists of two portions adjacent, butted or nested together wherein the shape objectives of both portions are achieved. There could be some tolerance or variation at the interface of the two shapes where, for example, the shapes can slide somewhat relative to each other or be angled or rotated somewhat relative to each other.

Referring back to portioning strategies for the combination of a first "normal" size portion and a second portion composed of a collection of small portions, the present invention can also be utilized to locate, on the workpiece, the best locations for a normal-sized portion and the collection of small portions in the form of, for example, nuggets or strips. Not infrequently, the workpiece is of varying thickness, perhaps thicker in one section and then transitioning to being thinner in another section of the workpiece. For example, in a poultry breast, the shoulder portion is typically quite thick, and thus well utilized for nuggets, while being too thick for patties or sandwich portions. However, the tail end of the breast is typically relatively thin, and thus, well utilized for patties or sandwich portions, but too thin for ideal nuggets. Thus, as shown in FIG. 13, it is desirable to define optimum locations for the normal sized portion 200, as well as for the second portion 206 consisting of a collection of nuggets or other small final pieces 202 on workpiece 204.

The thickness of the workpiece and the variation or change therein can initially be determined by scanning With this information to define, at least initially, locations for the normal portion 200 and for the nugget collection region 206, constraints or additional conditions can be utilized for such initial selection. The constraints can be in the form of a cost function, wherein the costs associated with excessive thickness of the normal sized portion would be high, and the costs associated with an excess of thinness for the nugget region would be high. These constraint functions can be used initially to place the normal sized portion 200 and the nugget region 206 on the workpiece 204 so that they are located at about the proper locations. The final locations of the normal sized portion and the nugget region can be determined by an optimization algorithm used to minimize the cost functions associated with placement of the normal sized portion 200 and the nugget collection region 206 on the workpiece 204. As a practical matter, it would be difficult for the optimization algorithm utilized to allow the location of the normal sized portion 200 on the workpiece 204 to be reversed with the location of the nugget collection region.

The foregoing description has discussed strategies for locating, on a workpiece, a region that is optimum for a collection of small portions, for example, nuggets or strips (hereinafter "nuggets"). The preset invention can also be utilized to optimally position or lay out a grid of nuggets on the workpiece, whether at a location on part of the workpiece or on the entire workpiece. In this regard, an initial nugget grid can be laid out on the workpiece approximately to the correct size to achieve the desired weight and aspect ratio or other shape criteria. The nuggets do not necessarily have to be rectangular in shape, but can be of other shapes, for example, square, triangular, round, etc. A cost function can be applied to the nuggets based on meeting the desired size, weight, aspect ratio, or other criteria applied to the nuggets. With this cost function, the coordinates of the grid intersections of the nuggets can be varied as the independent variable, or "directly controlled parameters." The cost function is designed to increase cost as individual nuggets of the grid are out of specification. The cost function can be designed to monitor both the total cost of the collection of nuggets, and the cost associated with each nugget. Successive optimization determinations can be made by movement of the grid pattern about the workpiece. After each optimization calculation, the highest cost nugget or nuggets can be identified and eliminated prior to the next optimization. Such highest cost nugget or nuggets will be located along the outside of the grid pattern. This typically would reduce the number of grid intersections and sharpen the focus on the remaining potential nuggets. Also, the convergence criteria for each of the optimization iterations could be relaxed somewhat to reduce the processing time for each optimization calculation. Once all of the nuggets in the grid are within a desired cost structure, optimization is completed, and the nuggets can be cut. Also, any part of the workpiece that is not to be used as nuggets can be cut in a way that is easy for either personnel or machinery to identify such trim portions of the workpiece as not being a nugget, so as to eliminate the likelihood that such trim portions will be mixed with good nuggets.

In the foregoing methodology for optimizing the location of nuggets on a workpiece, rather than moving the entire grid pattern as a unit, the boundary points of individual nuggets could be moved, thereby for each such nugget investigated, determining its aspect ratio, shape conformance and weight, and other desired specifications, either sequentially or simultaneously. In this technique, the nuggets of the grid pattern can vary with respect to other nuggets in size, shape, aspect ratio, weight, etc.

As a further aspect of the present disclosure, the methodology described above can be utilized to identify one or more parameter values that represent physical attributes or features of a workpiece which, in turn, can be employed to better characterize or model the specific workpiece. For example, with respect to the example of poultry (chicken) breast butterfly, as noted above, such workpieces include a keel, such as keel 73 of poultry breast 70, shown in FIG. 7. The keel 73 runs along the center of the poultry breast, and most users typically wish to exclude the keel from the final cut portions. Knowing the location of the keel on the poultry breast is helpful to know where the chicken breast can be cut to eliminate the keel. Moreover, the location of the keel helps to define or characterize the position and angular orientation of the chicken breast, for example, on the conveyor 12, shown in FIG. 1A.

Various techniques can be utilized to locate the keel of the poultry breast. One such technique involves locating a line of best symmetry in the poultry breast. In this regard, many analysis techniques definitions of symmetry can be employed, including, for example, mass distribution, of the breast halves matching the reflectivity of the poultry breast halves as determined during scanning, or minimizing the deviation of the outlines of the outer perimeters of the two sides of the poultry breast. Moreover, it is possible to consider the symmetry between the two sides of the poultry breast with some distortion, due to poultry breast meat being quite flexible, and thus perhaps not laying flat on the conveyor on both sides of the keel 73. For example, the scanning and other techniques discussed above can be used to detect folding or bunching of the breast meat that might change or distort the shape and size of the breast at one or both sides of the breast. In addition, it is also possible to consider the symmetry between the two sides of the poultry breast with some asymmetry due to the shape of the breast keel. Although breast keel 72 is illustrated in FIG. 7 as being substantially symmetrical about centerline 74, not uncommonly one end, or at least one section, of a poultry breast keel may be shifted laterally relative to the remainder of the breast keel. The scanning and analysis techniques of the present disclosure can be used to detect and characterize as well as accommodate "distortion" or other distortions or anomalies of the breast keel.

In addition to employing the "line of best symmetry" in locating the keel of the poultry breast, other physical attributes of the chicken breast might also be considered. For example, the outline of the poultry breast might be determined at a specific thickness or height above the conveyor belt. Alternatively, the poultry breast might be sheared along the determined keel line 74, and then the two sides of the poultry breast shifted relative to each other along the keel line a small distance (for example, a few millimeters). The resulting configuration could then be analyzed to see the effect on the line of best symmetry technique. This can help to evaluate if in fact the initially determined keel line is accurate.

A further technique for identifying the keel of the poultry breast involves finding a "best fit" of the keel "valley" in the geometry of the poultry breast being analyzed. Typically in a poultry breast, the location of the keel is along a valley or trough extending along the keel. This valley or trough can be utilized as an independent parameter in the method of the present invention. One technique for locating the keel valley is described in U.S. Pat. No. 7,452,266 ("the '266 patent"), which is incorporated herein by reference. However, in the '266 patent, the endeavor is to locate a depression in a height map of the workpiece to coincide with additional indicators of keel location, such as the principal axis of the workpiece or alignment of the valley with the neck notch of the breast. In the present application, on the other hand, the goal is to try to find a location on a workpiece where a depression of a certain shape fits the best in seeking to optimize an optimization function.

In order to use the shape or location of the keel of a poultry (chicken) breast as an independent parameter, the processor 20 and scanner 16 are employed to locate and physically characterize the keel on the workpiece. This keel identification process occurs following scanning. In addition, the rest of the portioning process, including determining where to place portions, as well as trimming the workpiece, would follow. Once the keel is identified, the coordinates of the workpiece, initially determined by the scanning process, may be transformed based on more accurate information or data obtained from the keel identification process. In short, locating parameter values that represent the physical attribute or feature of the keel can help to better determine or identify the location, position, orientation, etc., of the workpiece, as well as the location and configuration of typical features of the workpiece, for example, the position and orientation (forward and/or backward) on the belt 12 of the neck notch. This information can be used to better determine how and where to cut, trim, slice, or otherwise process the workpiece. With this information, reference points on the workpiece can be established that can be used for portioning the workpiece. This is explained above with respect to the cutting starting point "O" in FIG. 7.

As noted above, identifying the keel and knowing its overall length and width may make possible the ability to directly infer other characteristics of the butterfly workpiece. For example, the rib meat of the poultry, which is the transition to dark meat with some attached fat, typically will be at the extreme distance from either side of the keel. This information helps to determine where fat that might need to be trimmed is located. In addition, most of the rest of the fat that requires trimming will be located along the edge of the rib meat, perhaps all the way to the tail.

Moreover, if locating the fat is important, knowing the foregoing likely positions of the fat on the poultry butterfly, it is possible to be more certain that the material which appears as fat in scanning is actually fat, and can be trimmed away with some confidence. Often the appearance of fat on a meat workpiece can be quite dark, especially if stained by blood. Moreover, the appearance of meat can be quite light, especially if scalded during removal of poultry feathers. As a consequence, frequently there is uncertainty about what is fat and what is meat on poultry workpieces. Knowing the location of the keel can reduce this uncertainty.

In addition, most customers do not desire to have the keel included in the portioned end pieces, since the keel contains cartilage and fat. Once the location of the keel is known, a high cost factor can be applied to any portion that crosses into the keel.

Moreover, the foregoing information could enable a simplified mathematical model of the, for example, butterfly workpiece to be created that could characterize a wide range of individual butterfly workpieces, in a manner similar to how a skilled sidewalk artist can create recognizable faces by modifying just a few key facial characteristics in otherwise very similar drawings. The input parameters of this mathematical model could be used as directly controlled specifications. In this case, the user can utilize the identified keel to limit the range of characteristics that need be considered in determining how to portion, trim, or otherwise process the workpiece.

The foregoing discussion focuses on physical attributes of the keel of a poultry breast. Of course, the present disclosure may be utilized with many other physical attributes, such as fat, bone, cartilage, tendons, tears in the workpiece, holes in the workpiece, edges of the workpiece, etc. Moreover, the optimizer function(s) can be used to avoid the above physical attributes when placing the final piece(s) on the workpiece, for example, the cost function can be defined to increase or slope significantly or even dramatically upward when the proposed location(s) of the final piece(s) on the workpiece is moved to any of the above undesirable situations. This will cause the present analysis to seek another location(s) for the final piece(s).

The foregoing methodology can be used with other types of workpieces, such as fish, steaks, rack of ribs, etc. Of course, each of these other types of workpieces would be defined with different mathematical models. Nonetheless, most meats, fish, poultry, or other types of workpieces have features that are a function of the species of the workpiece and/or a function of the upstream processing of the workpiece, such as the deboning of poultry or fish. To the extent that the foregoing techniques can be used to create simplified models of these workpieces and then fit individual portions to be cut to the simplified models, more intelligent decisions can be made as to how and where to cut, trim, or otherwise process a workpiece. For example, the process can be used to identify the location of a bone to miss during cutting or trimming, or the location of a tendon, so as to slow the speed of the cutter passing over the tendon. Also, this process can be used to reduce the typical ambiguity in trimming fat, since the present technique can be used to identify the anatomical location of the attached fat to be removed, as opposed to perhaps simply a scrap of fat that happens to be lying loosely on top of the workpiece. In essence, the present technique can be used to augment scanning techniques currently utilized, as described above.

While the preferred embodiments of the invention have been illustrated and described, it will be appreciated that various changes can be made therein without departing from the spirit and scope of the invention. In this regard, the steps of the methods described herein can be carried out in sequences other than specified. Also, one or more of the specified steps can be deleted or modified from that described herein. Also, other modifications can be made to the methods described herein.

The embodiments of the invention in which an exclusive property or privilege is claimed are defined as follows:

1. A method of automatically portioning a food workpiece into one or more final pieces, comprising:
   (a) designating target values or ranges of target values of one or more directly-controlled physical characteristics of the one or more final pieces;
   (b) designating one or more indirectly-controlled physical characteristics that result from the application to the food workpiece of the one or more directly-controlled physical characteristics of the one or more final pieces to be portioned from each food workpiece;
   (c) scanning the food workpiece to obtain scanning information;
   (d) simulating portioning the food workpiece according to one or more directly-controlled physical characteristics of the one or more final pieces;
   (e) calculating the values or ranges of values of the one or more indirectly-controlled physical characteristics of the one or more final pieces to be portioned resulting from applying the one or more directly-controlled physical characteristics to the scanned food workpiece;
   (f) repeating the simulating of the portioning of the food workpiece for multiple combinations of the one or more directly-controlled physical characteristics, and rating each combination based on how closely the combination achieves the desired target values or range of target values of the one or more directly-controlled physical characteristics and/or the target values or range of target values of the resulting one or more indirectly-controlled physical characteristics;
   (g) using one or more algorithms to select potentially acceptable one or more directly-controlled physical characteristics until an acceptable combination of one or more directly-controlled physical characteristics and one or more indirectly-controlled physical characteristics resulting from applying the one or more directly-controlled physical characteristics to the food workpiece are determined;
   (h) wherein each potential combination from steps (d) and (f) is rated according to an optimization algorithm as applied to one or more of the one or more directly-controlled and/or indirectly-controlled physical characteristics, with the optimization rating of the one or more directly-controlled and/or indirectly-controlled physical characteristics related to the deviation of the one or more directly-controlled and/or indirectly-controlled physical characteristics from an ideal physical characteristic target value or range of target values;
   (i) wherein said optimization algorithm functions to select an acceptable combination of one or more directly-controlled physical characteristics and/or one or more indirectly-controlled physical characteristics within a limited number of iterations without having to consider all possible combinations of target values of or ranges of target values of one or more directly-controlled physical characteristics and the target values or ranges of target values of one or more indirectly-controlled physical characteristics that result from applying the one or more directly-controlled physical characteristics to the food workpiece; and
   (j) portioning the workpiece according to the combination of physical characteristics as determined in steps (h) and (i) above.

2. The method of claim 1, wherein:
   a weighting factor is applied to one or more directly-controlled and/or indirectly-controlled physical characteristics; and
   the weighting factor is automatically adjusted based on one or more selected algorithm(s) to maximize the optimization rating of the one or more directly-controlled and/or indirectly-controlled physical characteristics.

3. The method of claim 1, wherein a plurality of optimization functions are applied to one or more of the one or more directly-controlled and/or indirectly-controlled physical characteristics.

4. The method of claim 3, wherein the plurality of optimization functions are simultaneously applied to one or more of the directly-controlled and/or indirectly-controlled physical characteristics.

5. The method of claim 1, wherein the optimization function chosen for use on a workpiece is selected from the group consisting of:
   the most desirable or ideal result;
   the first result that provides an acceptable combination; and
   the result that provides the greatest number of final pieces of specific directly-controlled and/or indirectly-controlled physical characteristics.

6. The method of claim 1, wherein the one or more directly-controlled physical characteristics are selected from the group of physical characteristics consisting of:
   the shape of the one or more end pieces to be portioned from the food workpiece;
   the size of the one or more end pieces to be portioned from the food workpiece;
   the location on the workpiece that the one or more end pieces are to be portioned from the food workpiece;

positioning on the workpiece the one or more end pieces to be portioned from the food workpiece;

the number of end pieces to be portioned from the food workpiece;

the weight of the one or more end pieces to be portioned from the food workpiece;

the angle of cutters used to portion the food workpiece; and the shape of one or more physical attribute(s) or feature(s) of the food workpiece.

7. The method according to claim 1, wherein:

a plurality of end pieces are to be portioned from the food workpiece; and the directly-controlled physical characteristic comprises positioning on the food workpieces one or more end pieces to be portioned from the food workpiece, said positioning selected from the group consisting of:

applying an optimization algorithm to each of the end pieces until optimum locations for the end pieces are located on the food workpiece; and locating the plurality of end pieces as a single composite portion on the food workpiece, with the end pieces bordering each other.

8. The method of claim 7, wherein the initial locations of the plurality of end pieces are based on meeting desired directly-controlled physical characteristics and/or indirectly-controlled physical characteristics.

9. The method according to claim 1, wherein:

a plurality of end pieces are to be portioned from the food workpiece; and a directly-controlled physical characteristic comprises the shapes of the end pieces, said shapes selected from the group consisting of:

a first nominal sized end piece and a plurality of significantly smaller sized end pieces that are collectively treated as a nominal sized second end piece, with an algorithm or analysis technique utilized to divide the second end piece into a plurality of smaller sized individual sub-portions; and a single composite portion of the individual adjacent portions end pieces.

10. The method according to claim 9, wherein the location of the single composite portion is determined by analyzing the extent to which each individual end piece of the composite portion meets desired directly-controlled and/or indirectly-controlled physical characteristics.

11. The method of claim 10, wherein the individual end pieces of the composite portion that do not meet the directly-controlled and/or indirectly-controlled physical characteristics are eliminated from the composite portion and the resulting remaining composite portion is analyzed to determine the extent to which the remaining composite portion meets the indirectly-controlled physical characteristics.

12. A system for portioning a food workpiece into one or more pieces, comprising:

a scanner for scanning the food workpiece;

a cutter for portioning the food workpiece; and a processor coupled to the scanner and the cutter, the processor controlled by computer-executable instructions for performing the steps of:

(a) receiving multiple acceptable combinations of target values or ranges of target values of:

(i) one or more directly-controlled physical characteristics of the one or more food workpieces; and (ii) one or more indirectly-controlled physical characteristics that result from the application to the food workpiece of the one or more directly-controlled physical characteristics of one or more final pieces to be portioned from each food workpiece;

(b) controlling the scanner to scan the food workpiece to obtain scanning information;

(c) simulating portioning the scanned-in food workpiece according to one or more directly-controlled physical characteristics and calculating the one or more indirectly-controlled physical characteristics of the one or more final pieces to be portioned according to the one or more directly-controlled physical characteristics;

(d) repeating simulating portioning of the food workpiece for multiple combinations of the one or more directly-controlled physical characteristics, and rating each combination based on how closely the combination achieves the desired target values or range of target values of the one or more directly-controlled physical characteristics and/or the resulting target values or range of target values of the one or more indirectly-controlled physical characteristics;

(e) using one or more algorithms to sequentially select potentially acceptable one or more directly-controlled physical characteristics until an acceptable combination of one or more directly-controlled characteristics and one or more indirectly-controlled physical characteristics resulting from applying the one or more directly-controlled physical characteristics to the food workpiece are determined;

(f) wherein each potential combination from steps (c) and (d) is rated according to an optimization algorithm as applied to one or more of the one or more directly-controlled and/or indirectly-controlled physical characteristics, with the optimization rating of the one or more directly-controlled and/or indirectly-controlled physical characteristics related to the deviation of the one or more directly-controlled and/or indirectly-controlled physical characteristics from ideal physical characteristic target values or range of target values;

(g) wherein said optimization algorithm functions to select an acceptable combination of one or more directly-controlled physical characteristics and/or one or more indirectly-controlled physical characteristics within a limited number of iterations without having to consider all possible combinations of target values of or ranges of target values of one or more directly-controlled physical characteristics and the target values or ranges of target values of one or more indirectly-controlled physical characteristics that result from applying the one or more directly-controlled physical characteristics to the food workpiece; and (h) controlling the cutter to portion the workpiece according to the combination of characteristics as determined in steps (f) and (g) above.

13. The system of claim 12, wherein the user interface enables the user to specify the importance to apply to the one or more directly-controlled physical characteristic and/or the one or more indirectly-controlled physical characteristic.

14. The system of claim 12, further comprising a user interface system that permits a user to enter and/or alter the one or more directly-controlled physical characteristics and/or the one or more indirectly-controlled physical characteristics.

15. The system according to claim 14, wherein the user interface provides the user with information concerning the values of one or more directly-controlled and/or indirectly-controlled physical characteristics being achieved.

16. The system according to claim 15, wherein the user interface is accessible to obtain statistical information regarding values of the one or more directly-controlled and/or indirectly-controlled physical characteristics being achieved.

17. The system of claim 12,
   A. wherein each combination is rated according to one of:
      a cost function as applied to one or more of the one or more directly-controlled and/or indirectly-controlled physical characteristics, with the cost applied to the one or more directly-controlled and/or indirectly-controlled physical characteristics increasing as the one or more directly-controlled and/or indirectly-controlled characteristic deviates from an ideal physical characteristic target value or range of target values; and
      a value function is applied to one or more of the one or more directly-controlled and/or indirectly-controlled physical characteristics, with the value applied to the one or more directly-controlled and/or indirectly-controlled physical characteristics, decreasing as the one or more directly-controlled and/or indirectly-controlled physical characteristics deviates from an ideal physical characteristic target value or range of target values, and
   B. wherein a weighting factor is applied to one or more directly-controlled and/or indirectly-controlled physical characteristics, and the weighting factor is automatically adjusted based on one or more selected algorithm(s) to minimize the cost function or maximize the value function of the one or more directly-controlled and/or indirectly-controlled physical characteristics.

18. The method of claim 12, wherein a plurality of optimization functions are applied to one or more of the one or more directly-controlled and/or indirectly-controlled physical characteristics.

19. The method of claim 18, wherein the plurality of optimization functions are simultaneously applied to one or more of the directly-controlled and/or indirectly-controlled physical characteristics.

20. The method of claim 12, wherein the optimization function actually chosen for use on a food workpiece is selected from the group consisting of:
   the most desirable or ideal result;
   the first result that provides an acceptable combination; and
   the result that provides the greatest number of final pieces that meet the directly-controlled and/or indirectly-controlled physical characteristics.

21. A non-transitory computer-readable medium including computer-executable instructions which, when loaded onto a computer, perform a method comprising:
   (a) simulating portioning a food workpiece according to target values or ranges of target values of one or more directly-controlled physical characteristics;
   (b) calculating the values or ranges of values of the one or more indirectly-controlled physical characteristics of the one or more final pieces to be portioned from the food workpiece resulting from applying the one or more directly-controlled physical characteristics to the food workpiece;
   (c) repeating simulating of the positioning of the food workpiece for multiple combinations of the one or more directly-controlled physical characteristics, and rating each combination is based on how closely the combination achieves the desired target values or range of target values of the one or more directly-controlled physical characteristics and/or the resulting one or more indirectly-controlled physical characteristics;
   (d) using one or more algorithms to analyze potentially acceptable one or more directly-controlled physical characteristics until an acceptable combination of one or more directly-controlled physical characteristics and one or more indirectly-controlled physical characteristics resulting from applying the one or more directly-controlled physical characteristics to the food workpiece are determined;
   (e) wherein each potential combination from steps (c) and (d) is rated according to an optimization algorithm as applied to one or more of the one or more directly-controlled and/or indirectly-controlled physical characteristics, with the optimization rating of the one or more directly-controlled and/or indirectly-controlled physical characteristics related to the deviation of the one or more directly-controlled and/or indirectly-controlled physical characteristics from ideal physical characteristic target values or range of target values; and
   (f) wherein said optimization algorithm functions to select an acceptable combination of one or more directly-controlled physical characteristics and/or one or more indirectly-controlled physical characteristics within a limited number of iterations without having to consider all possible combinations of target values of or ranges of target values of one or more directly-controlled physical characteristics and the values or ranges of target values of one or more indirectly-controlled physical characteristics that result from applying the one or more directly-controlled physical characteristics to the food workpiece.

22. The non-transitory computer-readable medium of claim 21,
   A. wherein each combination is rated according to one of:
      a cost function as applied to one or more of the one or more directly-controlled and/or indirectly-controlled physical characteristics, with the cost applied to the one or more directly-controlled and/or indirectly-controlled physical characteristics increasing as the one or more directly-controlled and/or indirectly-controlled physical characteristics deviate from ideal physical characteristic target values or range of target values; and
      a value function as applied to one or more of the one or more directly-controlled and/or indirectly-controlled physical characteristics, with the value applied to the one or more directly-controlled and/or indirectly-controlled physical characteristics decreasing as the one or more directly-controlled and/or indirectly-controlled physical characteristics deviate from ideal physical characteristic target values or ranges of target values; and
   B. wherein a weighting factor is applied to one or more directly-controlled and/or indirectly-controlled physical characteristics, and the weighting factor is automatically adjusted based on one or more selected algorithm(s) to minimize the cost function or maximize the value function of the one or more directly-controlled and/or indirectly-controlled physical characteristics.

23. The non-transitory computer: readable medium of claim 21, wherein a plurality of optimization functions are applied to one or more of the one or more directly-controlled and/or indirectly-controlled physical characteristics.

24. The non-transitory computer-readable medium of claim 23, wherein the plurality of optimization functions are simultaneously applied to one or more of the directly-controlled and/or indirectly-controlled physical characteristics.

25. The non-transitory computer-readable medium of claim 22 wherein the optimization function actually chosen for use on a workpiece is selected from the group consisting of:
- the most desirable or ideal result;
- the first result that provides an acceptable combination; and
- the result that provides a desired set of final pieces that meets the directly-controlled and/or indirectly-controlled physical characteristics.

* * * * *

UNITED STATES PATENT AND TRADEMARK OFFICE
CERTIFICATE OF CORRECTION

Page 1 of 1

PATENT NO. : 9,128,810 B1
APPLICATION NO. : 13/358423
DATED : September 8, 2015
INVENTOR(S) : G. R. Blaine et al.

It is certified that error appears in the above-identified patent and that said Letters Patent is hereby corrected as shown below:

IN THE CLAIMS

| COLUMN | LINE | ERROR |
|---|---|---|
| 32 | 60 | "computer: readable" should read |
| (Claim 23, | line 1) | --computer-readable-- |

Signed and Sealed this
Twenty-second Day of March, 2016

Michelle K. Lee
*Director of the United States Patent and Trademark Office*